United States Patent [19]
Cherry et al.

[11] Patent Number: 5,641,020
[45] Date of Patent: Jun. 24, 1997

[54] TREATMENT OF CONTAMINATED WATER IN CLAYS AND THE LIKE

[75] Inventors: John Anthony Cherry; Beth L. Parker, both of Waterloo, Canada

[73] Assignee: University of Waterloo, Waterloo, Canada

[21] Appl. No.: 444,676

[22] Filed: May 19, 1995

[30] Foreign Application Priority Data

May 20, 1994 [GB] United Kingdom ............... 9410134

[51] Int. Cl.$^6$ ............................ B09C 1/08; E21B 43/26
[52] U.S. Cl. .................. 166/250.1; 166/308; 210/747; 405/52; 405/128
[58] Field of Search ........................ 405/128, 129; 166/250.1, 308, 177.5, 191, 297

[56] References Cited

U.S. PATENT DOCUMENTS

| | | | |
|---|---|---|---|
| 2,851,109 | 9/1958 | Spearow | 166/177.5 |
| 3,167,124 | 1/1965 | Graham | 166/308 X |
| 5,032,042 | 7/1991 | Schuring et al. | 405/128 X |
| 5,054,961 | 10/1991 | Sherman | 405/128 |
| 5,120,160 | 6/1992 | Schwengel | 405/128 |
| 5,449,251 | 9/1995 | Daily et al. | 405/128 |
| 5,468,088 | 11/1995 | Shoemaker et al. | 405/128 X |
| 5,476,992 | 12/1995 | Ho et al. | 405/128 X |

*Primary Examiner*—George A. Suchfield
*Attorney, Agent, or Firm*—Anthony Asquith & Co.

[57] ABSTRACT

The treatment system involves the use of hydrofracturing in drilled boreholes over the treatment area. The hydrofracturing fluid contains treatment material, of the kind that causes chemical breakdown of the contaminant. The breakdown leads to a contaminant concentration of zero in the hydrofracks, and therefore the contaminant diffuses towards the hydrofracks, where it is in turn broken down. Calculations and measurements indicate whether natural cracks in the ground are far enough apart to make hydrofracturing worthwhile. A formula indicates, from an assessment of diffusion coefficients, etc, whether the contaminant will be rendered safe within a given time period.

24 Claims, 12 Drawing Sheets

$$\frac{M_R}{M_D} = \frac{[1-P(t_T)] - [1-P(t_T-t_D)]}{1 - P(t_D)}$$

$$P = \frac{8}{\pi^2} \sum_{n=1,3,5,\ldots}^{\infty} n^{-2} \exp\left(-n^2 \pi^2 \frac{D_e t}{RL^2}\right)$$

$$R = 1 + (p_b/\phi)K_1$$

TREATMENT OF CONTAMINATED WATER IN CLAYS AND THE LIKE

At many industrial sites where chemicals have entered the subsurface, there exist deposits or layers of silt or clay or siltstone or shale, having low-permeability.

These geologic materials commonly have numerous small natural fractures (crack, joints, fissures) or other higher permeability areas, that have allowed passage of contaminants into the deposits. Over the years, or the decades, the gradual movement of water and contaminants in these small but open fractures caused the nearly impervious but somewhat porous soil or rock between the fractures to be invaded by the contamination.

This invasion of contaminants into the low permeability clay soil or rock mass occured primarily, and sometimes exclusively, by molecular diffusion of chemical species from the cracks and into the blocks of low permeability material (LPM) between the cracks; that is to say, the mechanism by which the water-borne contaminant entered the blocks of LPM did not involve movement of the water.

Because the cracks are small (generally much less than 1 mm in aperture), the overall mass of soil or rock permits the passage of very little water over time. But even so, there is sufficient movement of water in the cracks and sufficient inward diffusion of contaminants from the cracks into the blocks of LPM, that a mass of the contaminant accumulated in the LPM.

That being so, the bulk soil or rock has become a hazardous material, according to the regulations in many jurisdictions, and therefore the soil contaminant levels must be reduced to levels below a specified standard.

The problem facing the engineer is that removal of the clay soil or rock by excavation is often prohibitively expensive. Also, typically, the contaminants cannot be pumped out using drains or wells because the soil or rock has insufficient permeability. The natural cracks therein are insufficient in number and/or size to allow active flushing with water. The engineer typically also finds that wells or drains can cause some flow of water through the natural cracks, but not through the blocks of LPM soil or rock.

Under the conventional remediation technologies, either the LPM has to be dug up and removed, at enormous expense, or the remediation of the LPM has to take a very long time.

THE GENERAL FEATURES OF THE INVENTION

In the invention, it is recognised that in many situations of contaminated LPM, it can be economically practical to remove the contamination from the blocks of LPM material by, in effect, reversing the process that caused the contamination to invade the blocks. The contaminant invaded the blocks by a process of inwards molecular diffusion: in the invention, the engineer uses a clean-up system that makes use of outward diffusion.

In the invention, outward diffusion of the contmainants from the blocks of LPM soil or rock is caused to occur, and the engineer must provide that outward diffusion occurs fast enough for the blocks to be cleaned up in a practical period of time.

In many jurisdictions, the authorities will not sanction a clean-up system that requires many years or decades in order to achieve the required decrease in the concentration of the contaminant. Clean-up times of several months to a few years, however, are generally acceptable.

The authorities will permit the time taken for clean-up to be a little longer, in a case where the clean-up is entirely automatic and passive. The more a clean-up system requires the constant attention and judgement of skilled persons, or the constant input of energy, or the need for on-going maintenance or operational costs, the less inclined the authorities are to sanction a system in which the clean-up time is measured in decades.

The invention provides the engineer with a system for causing outward diffusion of the contaminant from the interior of the LPM block. With the invention, effective clean-up periods are typically several months or a few years. The authorities can allow the clean-up to be done over this time scale, or even longer, because the cost of operating the system involves no continuous input of energy or treatment substances. Once installed, the system operates of its own accord for a long period of time.

As a starting point the engineer determines soil or rock conditions through drilling and sampling of boreholes, and determines the locations (area and depth) and concentrations of contaminants. The engineer is aware of the clean-up levels that must be achieved for the soil or rock to be approved, according to government regulation, as having been successfully restored.

The engineer then selects the treatment process that will be used to cause the contaminants to be degraded or destroyed in the ground. In the invention, the treatment process is caused to occur within artificial cracks or fractures made in the LPM by the operation of induced fracture. The artificially-induced cracks or fractures are termed fracks.

In the situation where contaminant destruction is made to occur in the fracks, the molecules of the contaminants must make their way, by outward diffusion, from the interior of the block of LPM towards the hydrofrack. The rate at which outward diffusion takes place is fastest when the fracks are close together and slowest when they are farther apart. Also, the shorter the distance the molecules of contaminant have to travel, the shorter the overall clean-up time. It is the engineer's task to select the optimum distance apart of the hydrofracks.

In a particular case, the time to achieve clean-up to the regulation standard is influenced by the soil or rock properties and the type of contaminant. Soil or rock tests are made to provide the engineer with the physical and chemical parameters necessary for the system design. With these properties known, the engineer makes calculations to determine the optimum distance apart between the fracks, ie the frack spacing.

As will be explained, these calculations rely on mathematical equations incorporating diffusion coefficients. It may be noted that transport of the contaminant molecules within the LPM block, by diffusion, does not or need not incorporate any effects of flow of groundwater in the hydrofracks or in the block material. For the purpose of the calculations, water in the blocks usually will be considered to be immobile.

The contaminant got into the LPM blocks by being borne along the natural cracks, whereby the concentration of the contaminant in the water within the cracks was quite high, and remained quite high over long periods. As molecules diffused into the blocks, they were replaced by further molecules of contaminant being borne in by the water in the cracks. Thus the boundaries of the blocks were constantly bathed in contaminated water, over a period of decades. Of course, by the time steps are being taken to clean-up a contaminant lying deep inside the blocks of LPM, the source of the contamination will have been been located and removed, and the water traversing (slowly) through the natural cracks is no longer carrying fresh contaminant.

The conventional approach to the problem of getting the contaminant out of the blocks is to flush clean water through the (natural) cracks, and to keep on flushing the clean water, whereby the blocks are constantly bathed in clean water. Furthermore, it was thought, if the clean water can be made to flow, even very slowly, through the actual block of LPM, so much the better. The notion was that the more vigorous the flushing, i.e the faster the velocity of the clean water—through the cracks, and through the blocks themselves—the quicker the clean-up will be completed.

(The expression "vigorous" flow should be construed in the context of typical flow rates through clays etc, being of the order of a few cm per year.)

It will be understood that the reason for wanting the vigorous flushing was to prevent the contaminant from building up at localised spots in the water. If contaminant were to become concentrated in the cracks, then the contamination concentration gradient would be less, and the contaminant would move out of the block more slowly. The reason for wanting movement of the water is the same reason why stirring is required in many chemical reactions, i.e to prevent local decreases of the concentration gradient of the contaminant (CG-C). In order to keep the blocks bathed in clean water, the water had to be moving.

Given that it took decades for the contaminant to invade the interior of the LPM blocks, provided the concentration in the water around the blocks can be kept low, it was thought that it might be possible to get the contaminant out in a shorter time. But this would only happen if the water could be kept clean, i.e if the water were constantly being replenished. If the water is allowed to acquire a concentration of the contaminant, it might even take longer to get the contaminant out of the LPM blocks than it took to get it in.

So, according to the conventional teaching, contaminant can be extracted from the LPM blocks by flushing clean water vigorously through the cracks between the blocks, and even, if it can be engineered, in causing the flushing water to flow through the LPM block itself.

Canadian patent publication number CA-2,111,279, (published 15 June 1994, shows a system for inducing flow in LPM, using permeable zones created by hydrofracturing and inducing the flow by means of electrical energy.

The problem with the conventional approach is that as the contaminant seeps out of the LPM block and into the crack, the concentration of the contaminant in the water within the crack goes up. Therefore, the concentration gradient is decreased, and diffusion of the contaminant out of the LPM block is correspondingly decreased. The conventional approach has been to keep the water moving, which is very difficult and expensive in low permeability material.

In the present invention, the contaminant is drawn out of the LPM block by diffusion, towards the block boundary, ie towards the induced cracks (fracks); but the concentration gradients are maintained, not by making the water move, but by a different mechanism. The different mechanism is based on the fact that, in the invention, a treatment material has been placed in the cracks, at the block boundary. Therefore, when the contaminant reaches the boundary, and comes in contact with the treatment material, the contaminant breaks down.

Thus, the high concentration gradient is preserved, and with it the high rate of diffusion out of the block, even though the water is not (or might not be) moving.

In the invention, the fracks serve two purposes. First, induced fracture physically splits the LPM blocks into smaller blocks, whereby the distance through which the contaminant has to diffuse is reduced; and second, the operation of induced fracture involves the injection of a induced fracture fluid into the fracks, and the treatment material is carried into the hydrofracks by being mixed with the hydrofracturing fluid.

The treatment material injected into the hydrofracks may be a solid (in the form of small grains), or the treatment material may be a liquid.

Hydrofracturing allows the treatment material to be placed in the ground so as to promote the in-situ destruction or immobilisation of the contaminants. The treatment material is composed wholly or partly of chemical substances that degrade the contaminants that diffuse out of the LPM blocks. The degradation imposes a concentration gradient from the centre of the block towards the boundary, ie towards the frack, which promotes diffusion of the molecules of the contaminant out of the block, into the hydrofrack, where they come into contact with the reactive particles in the frack.

The particles of treatment material injected into the frack at the time the frack is made should be sufficient in amount to cause degradation of all the contaminant contained in the LPM blocks of soil or rock. If not enough treatment material is provided, or if the treatment material should become depleted as the contaminant is degraded, more treatment material would have to be injected in later.

In the invention, re-injection, or refreshment of the treatment material can be done simply, without re-induced fracture, provided the treatment material is liquid. The task of refreshment is made simple if the fracks, when they were made, were left propped open, by the use of suitable proppants; in that case, it is possible for the engineer to return later, and simply inject treatment liquid, at a comparatively low pressure, into the propped-open fracks. This kind of refreshment-by-low-pressure-injection is much cheaper than induced fracture itself. When the treatment material is liquid, the props may comprise grains of sand or other inert filler material.

If the hydrofracks were not propped open, refreshment-by-reinjection would not be practical. Refreshment then would have to be done by re-induced fracture. Apart from the expense of that, it is difficult to re-induced fracture ground that has already been induced fracture and maintain the required degree of control over the geometry of the fracks.

If the treatment material is solid, the treatment material itself, being in granular form, will inevitably act as props to hold the fracks open. However, when the treatment material is solid particles, refreshment-without-reinduced fracture of the solid particles is only possible if the refreshment particles are smaller than the original particles. The small particles may be suspended in a gel, to keep them evenly dispersed during injection. Preferably, the gel should later dissolve or degrade.

If there should be a naturally-induced movement of water in the propped-open fracks, that would not be of much importance, at least from the theoretical standpoint of the breakdown reaction. The concentration gradient caused by the degradation of the contaminant is independent of whether the water is moving. However, it can be a practical disadvantage if the water moves: if the treatment material is a liquid, whether soluble or insoluble in the water, the treatment material might be carried away by the movement of the water; if the treatment material is a solid, the solid material might be leached away by the moving water. Even solid treatment materials are often subject to slowly dissolving in moving water.

In the invention, the treatment material does its job most efficaciously if the water remains completely still. However, it is noted that the loss of treatment material if the water were to be moving is often not significant.

When the treatment material is liquid, the liquid itself diffuses inwards into the interior of the LPM block, from the hydrofrack. This inwards diffusion of the treatment liquid has two benefits: first, the treatment liquid is much more resistant to being washed away by moving water in the fracks once it has diffused into the LPM; and second, whatever physical distance the treatment liquid diffuses inwards into the block shortens the distance that must be traversed by the outward-diffusing contaminant.

It can happen, with some kinds of solid treatment material, that, when the contaminant degrades, a precipitation takes place, and this can lead to the build-up of a coating on the grain of treatment material. If such a coating does tend to form, and if the coating would then inhibit the degradation reaction, use of the invention might be contra-indicated. As mentioned, there are difficulties in refereshing the treatment material, when the treatment material is in the solid phase.

Also, in some cases, the treatment material itself degrades or disappears as a result of the contaminant-degradation reaction, and in those cases also the invention may not be of benefit.

However, there are very many treatment reactions of the type in which the contaminant is converted into liquids or gases, rather than solid precipitates, and where the treatment material is largely unaffected by the degradation of the contaminant. In fact, the invention is very beneficial when the treatment material serves as a catalyst. Also, in cases where the degradation is of a microbiological character, although the treatment material may be used up, the material may grow or re-grow itself in-situ.

As regards the matter of propping the fracks open, it is noted that when the treatment material is in the form of solid grains, the fracks are automatically propped open by the grains; and when the treatment material is in the form of a liquid, it is an advantage to prop the fracks open with e.g sand grains because then it becomes simple to refresh the liquid treatment material on some future occasion if that should be desired. In both cases, therefore, the fracks are propped open.

It should be pointed out again that propping the fracks open is not done in order to increase the permeability of the ground, thereby promoting the throughflow of water to flush the contaminant out. In the invention, there is no need for the water to flow. The invention is efficacious even though the water is stationary. In the invention, there is no need for the cracks or the LPM to have increased permeability; the contaminant is drawn out of the blocks and towards the boundaries and into the hydrofracks by a concentration gradient induced by the fact that the local concentration of the contaminant is reduced to zero or near zero by chemical breakdown of the contaminant, not by flushing away the contaminant. Once the treatment material has been placed in the frack, as far as the process of diffusion of the contaminant towards the hydrofracks is concerned, the fracks may be impermeable.

Even when the treatment material is fluid, and the fluid invades the block, thereby beneficially shortening the distance between itself and the contaminant, permeability is not required of the fracks or of the LPM. In fact, movement of the water could be regarded as a disadvantage, in that such movement tends to wash the treatment material away. The contaminant does not need to be carried away, because the contaminant has broken down.

THE PRIOR ART

As mentioned, it has been proposed (in CA-2,111,279) to use induced fracture as a way of creating a zone of increased permeability, whereby flushing water may be pumped (or electrically induced in that specific case) through the contaminated soil. Included also is the proposal that certain treatment materials be introduced into the low-permeability clay and silt, by means of induced fracture. However, if the spacing of the hydrofracks, etc, is not done properly, and following careful calculations, the diffusion mechanism as described, for getting the contaminant out of the blocks, either will not occur or takes far too long.

In the invention, the zero, or near zero, contaminant concentration at the block boundaries is created, not by flushing, but by chemically breaking down the contaminant. Utilising that principle to induce the contaminant out of the blocks reasonably completely, and in a reasonable total time, does not happen accidentally, simply because the operation of induced fracture is employed. The various parameters have to be right, including the diffusion coefficients, concentration of the treatment material, spacing of the fracks, and so on, as will be explained. In the invention, preferably measurements and calculations, as described herein, are carried out before doing the hydrofracturing. In one of its aspects, the invention consists in selecting certain aspects of the hydrofracturing operation in accordance with certain measurements and calculations.

The system of the invention is designed according to different criteria from a system that operates by flushing. This is not to say that physical flushing movement of the water does not work. Given that a low concentration of contaminant is needed in the water, the prior teaching has been that the water must be moved, or otherwise local concentration gradients become too small. The normal teaching is that stirring renews concentration gradients. If stirring is discontinued, reactions will start to slow down.

DETAILED DESCRIPTION OF PREFERRED EMBODIMENTS

By way of further explanation of the invention, exemplary embodiments of the invention will now be described with reference to the accompanying drawings, in which.

The apparatuses and procedures shown in the accompanying drawings and described below are examples which embody the invention. It should be noted that the scope of the invention is defined by the accompanying claims, and not necessarily by specific features of exemplary embodiments.

Figure 1:
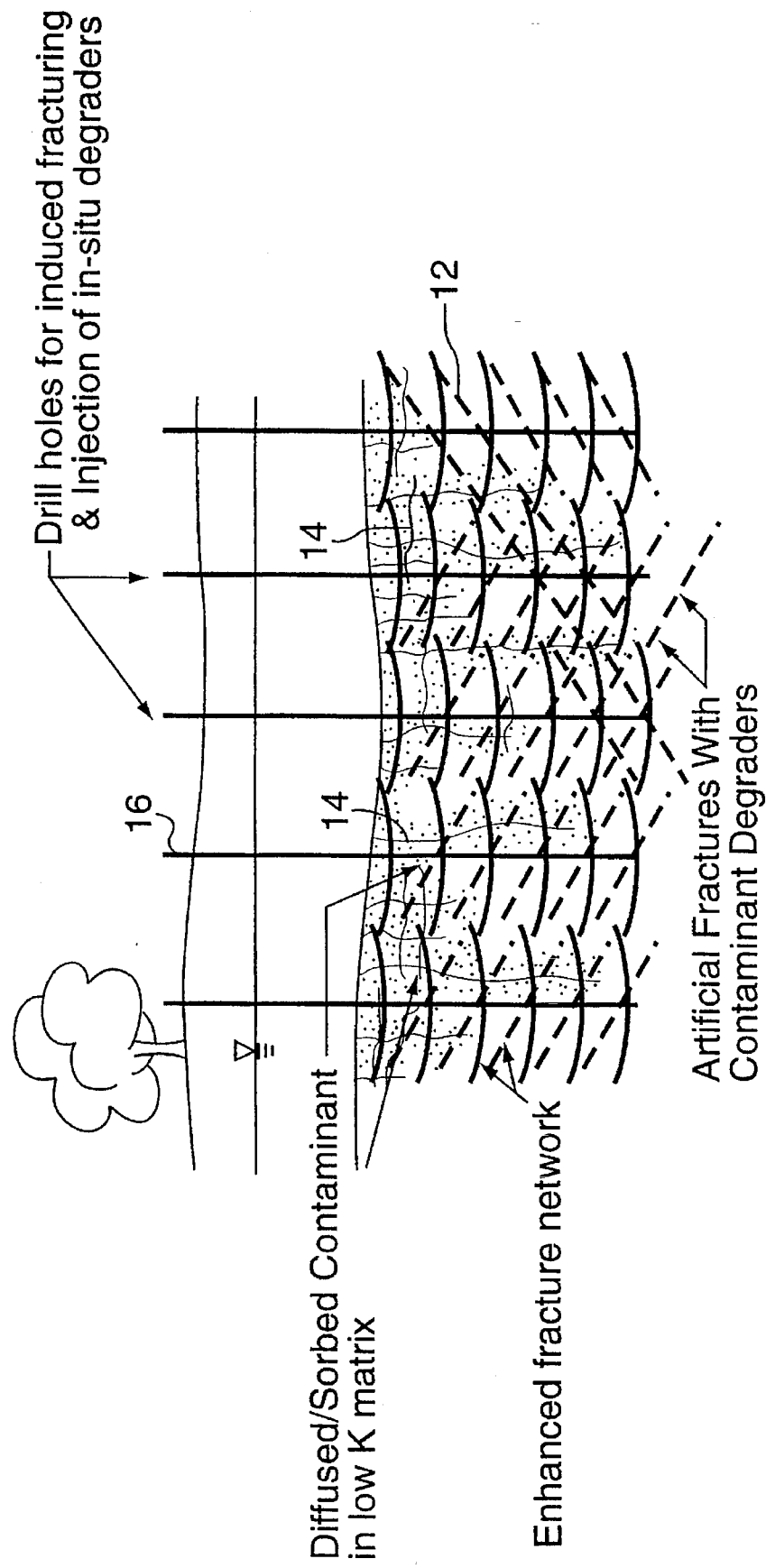
FIG. 1 is a vertical cross-section of an area of ground, in which clean-up of a contaminant is taking place in accordance with the invention.

A schematic diagram of induced fractures is presented in FIG. 1. Boreholes 16 are drilled over the contaminated area of ground. Hydrofracturing is carried out by sealing off a particular level or depth of the borehole, and then injecting hydrofracturing liquid at a high pressure. The liquid forces its way outwards into the ground surrounding the borehole, and in fact the liquid creates its own horizontal crack, which it fills, whereby a large disc or pancake of the injected liquid is placed in the ground. The induced crack or fracture, termed the hydrofrack, containing the disc of liquid, may be a centimetre or two deep near the borehole, tapering to nothing, towards the far extremes of the hydrofrack. The hydrofrack may be several metres in diameter.

After the hydrofracturing injection pressure is released, the crack tends to close up again. Particles of sand or other solids may be included in the hydrofracturing liquid, to serve as proppants to hold the cracks open.

The initial formation of the hydrofrack may be assisted by pre-cutting a notch, internally, around the circumference of the borehole. This may be done by mechanically trepanning the notch, or by cutting the notch with a jet of water. Once the crack is started, the crack tends to propagate itself horizontally. Thus, a series of hydrofracks can be placed at different depths, each extending outwards several metres into the surrounding ground, and each a centimetre or two thick.

The diameter of the hydrofrack depends on the pressure with which the hydrofracturing liquid was injected. The pressure that can be built up in the liquid in turn depends on the permeability of the ground: very little pressure can be built up in gravel, for example, because the fluid just leaks away. The hydrofrack ends when the pressure and velocity energy of the injected liquid is dissipated into natural cracks and fissures. Hydrofracturing itself is a conventional operation.

In FIG. 1, the hydrofracks are shown by the heavy lines 12. There are generally some natural cracks present in the ground already, which are shown at 14.

Figure 2B:
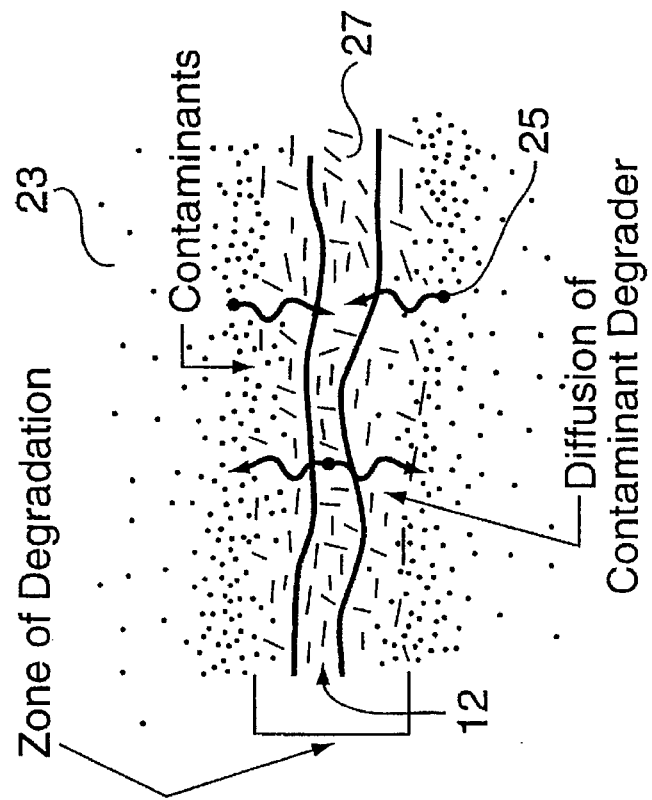
FIGS. 2A and 2B are close-up views of cracks in the ground shown in FIG. 1.
Figure 2A:
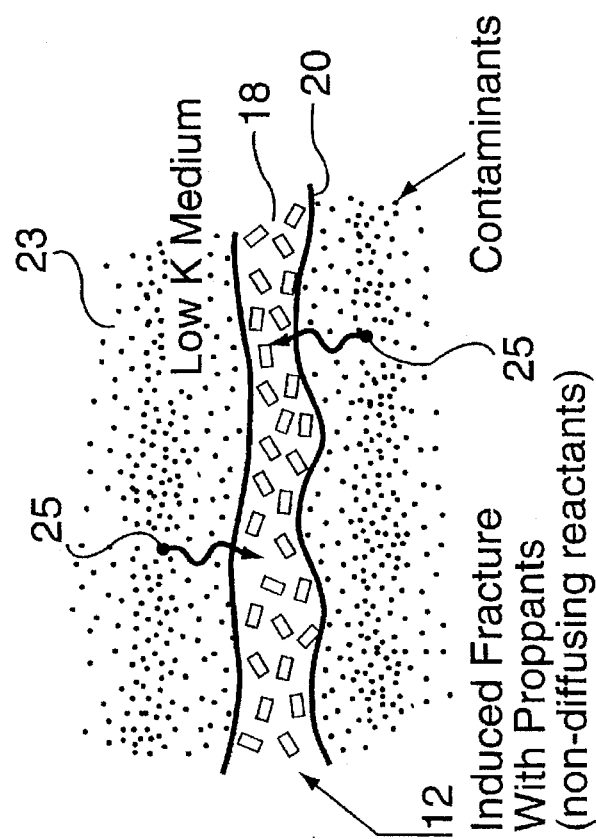

FIGS. 2A and 2B illustrate diagrammatically the two types of migration that can occur by diffusion.

In FIG. 2A, a hydrofrack 16 has been filled with solid grains 18 of treatment material. Any contaminant near the boundary 20 of a block 23 of low permeability material (clay or rock) will be broken down, whereby the concentration of the contaminant near the boundary will drop. The concentration gradient thereby induced will cause other molecules 25 to move towards the boundary, where they too will be broken down.

In FIG. 2B, that same diffusion of the contaminant molecules out of the blocks 23 is taking place, but also the molecules of the treatment material itself 27 is starting to diffuse into the blocks, whereby the treatment material "chases" the contaminant, and the contaminant does not have so far to travel to reach the treatment material. For the treatment material to be mobile in this manner, the treatment material should be a liquid, or should be dissolved in liquid.

Figure 3:
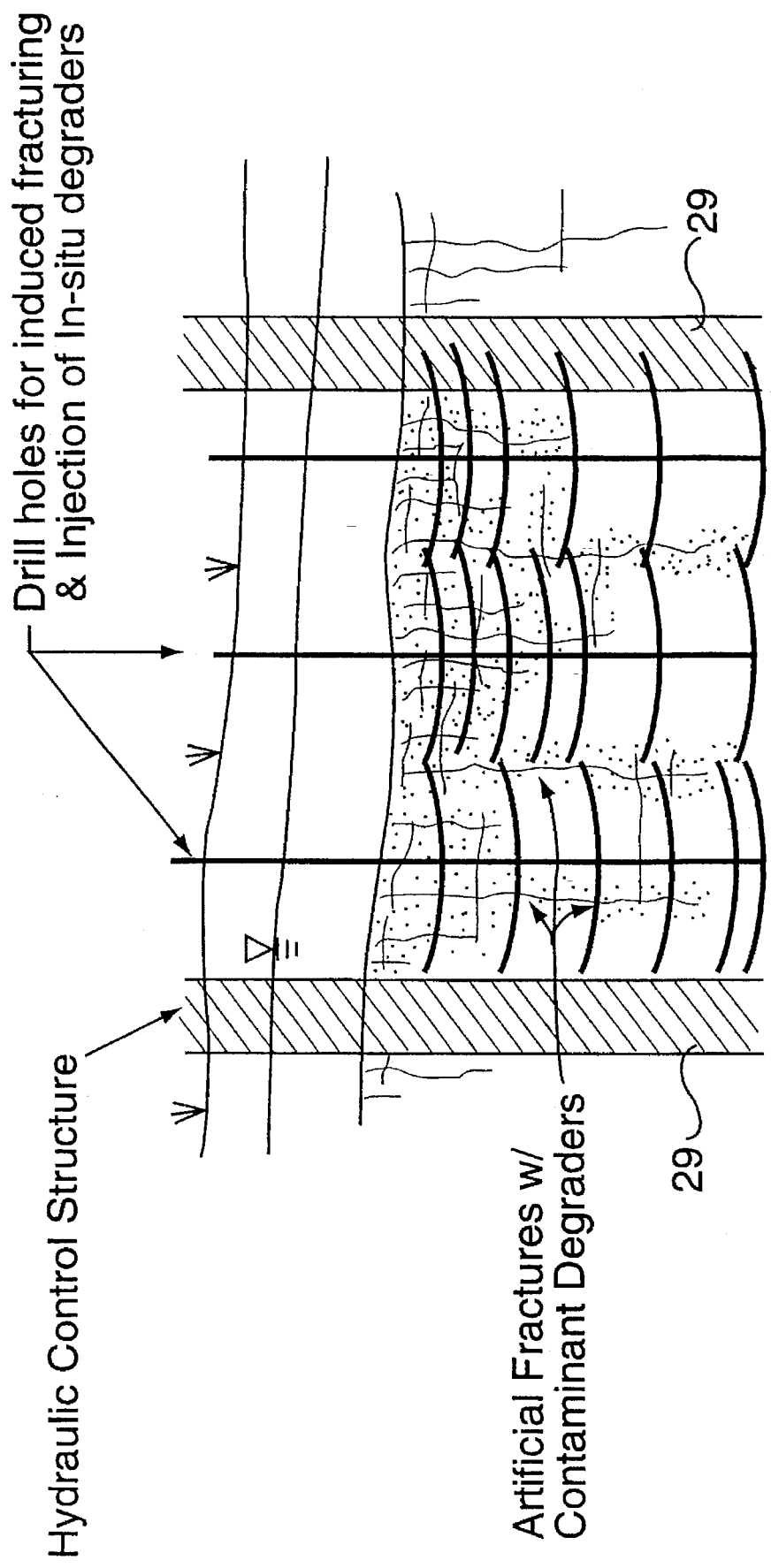
FIG. 3 is a cross-section corresponding to FIG. 1 of a second area of contaminated ground.

As mentioned, in some cases a velocity of the water flow within the cracks can be disadvantage, in that it can wash away or leach away the treatment material, whereby the engineer wishes to provide some means for slowing the movement of water. In such a case, it is possible to provide a barrier, for example a wall of pile-driven sheet-metal elements, around the treatment site. The wall does not have to be waterproof: its function is merely to slow down the flow velocity of water. Of course, barriers are expensive, and in many cases it would not be economical to place a barrier around a site just for the purpose of slowing down the water velocity in the hydrofracks. However, in many other cases, a barrier has to be provided anyway around a contaminated site, and in that case advantage can be taken of the presence of the barrier. FIG. 3 shows the use of flow-inhibiting barriers 29 around the site.

Figure 4:
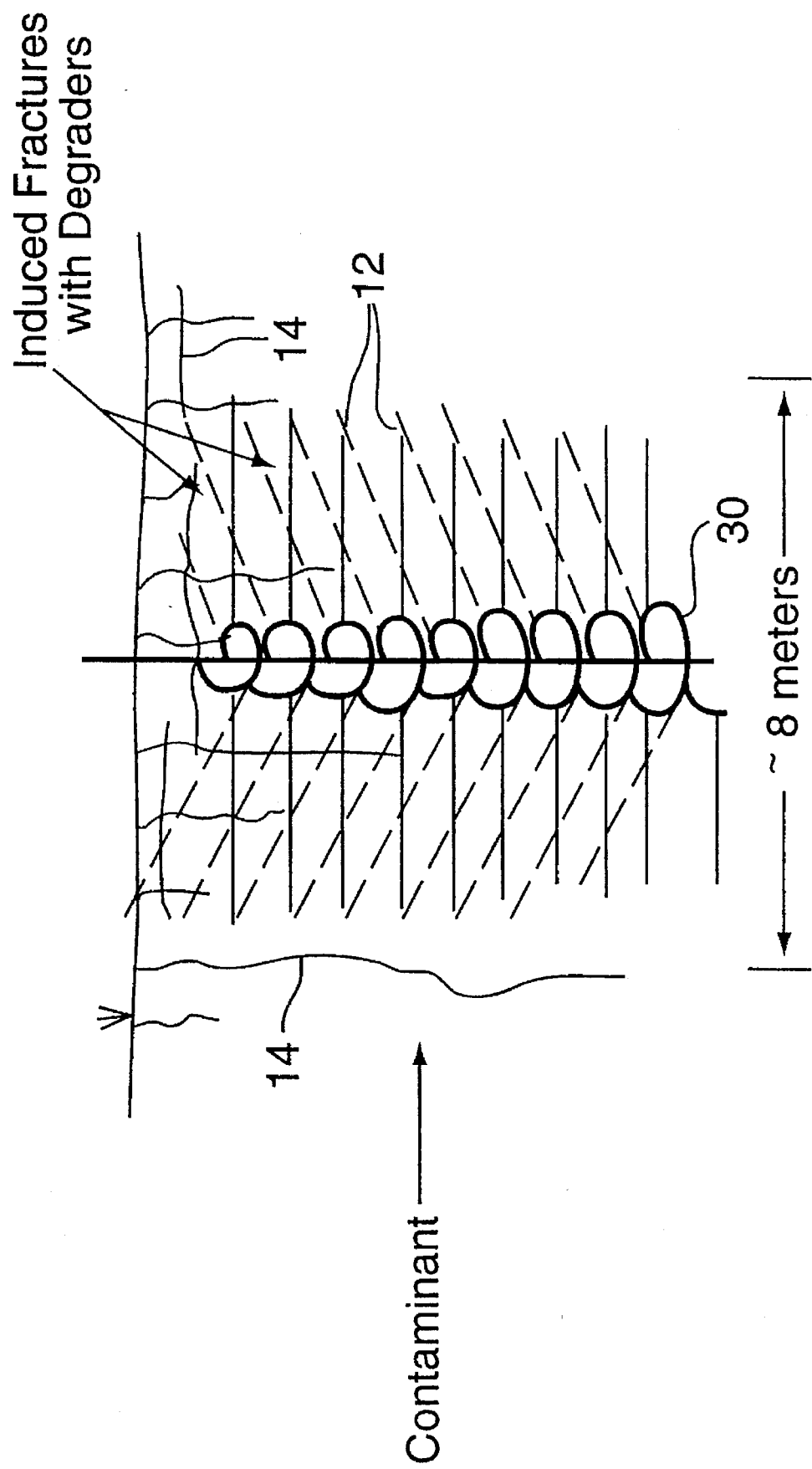
FIG. 4 is a cross-section corresponding to FIG. 1 of a third area of contaminated ground.

FIG. 4 shows a particular type of hydrofracturing, in which the hydrofracks are not a series of separate discs, but are formed as a single continuous spiral 30. This technique of hydrofracturing may be used in cases where the ground is suitable for its use.

Figure 5:
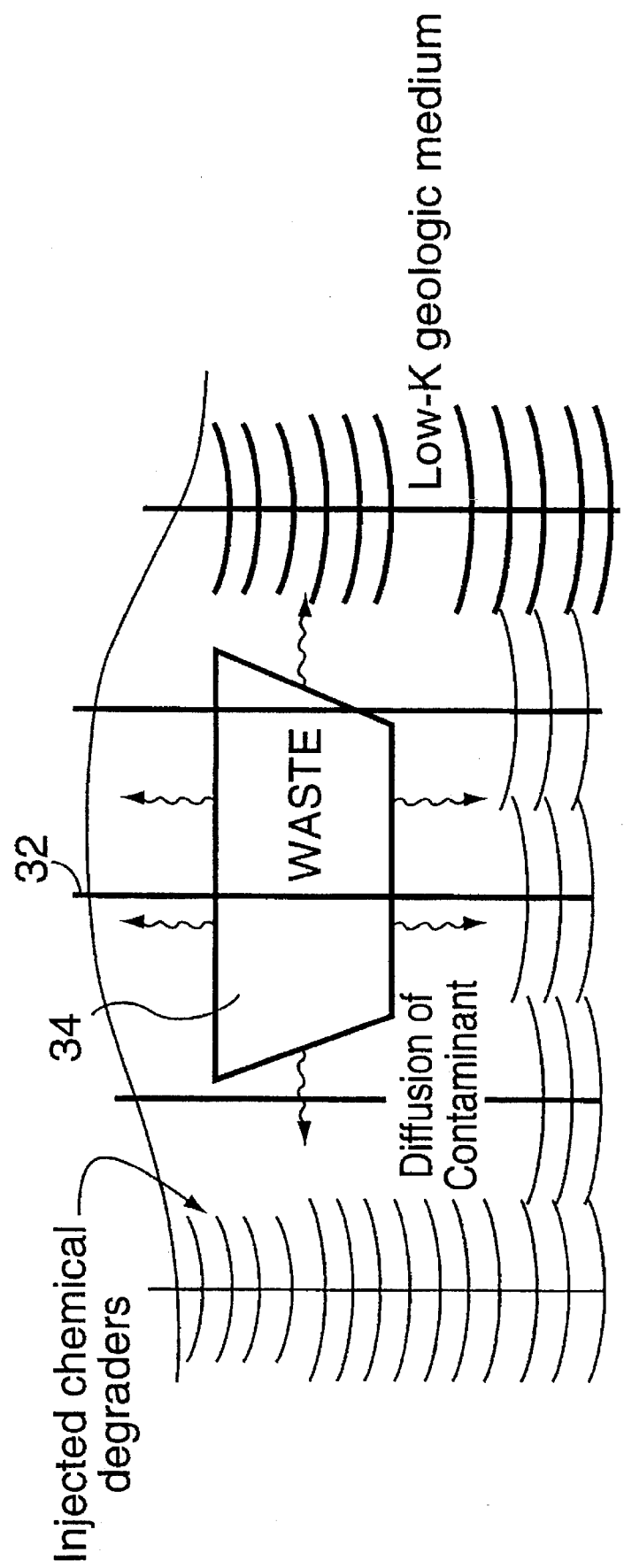
FIG. 5 is a cross-section corresponding to FIG. 1 of a fourth area of contaminated ground.

FIG. 5 shows the use of hydrofracturing to inject the chemical degraders not only around a contaminated site, but also underneath the source of contaminants, which may be for example a hazardous-waste disposal site. Here, the boreholes 32 are drilled right through the waste material 34. Hydrofracturing is carried out in those holes only below the level of the waste.

Figures 6, 7:
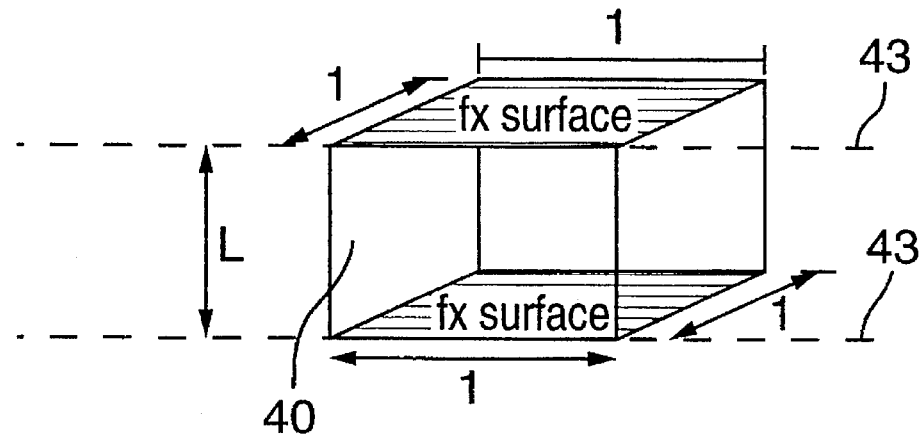
FIG. 6 is a diagram of a block of LPM containing contaminant.
FIG. 7 is a representation of an equation used in making a determination as the efficacy of treatment.

FIG. 6 is a diagram showing a block 40 of low permeability material. The block is bounded above and below by hydrofracks 43 containing treatment material. The block is of unit dimensions in plan, and is of height L; that is to say, the distance between hydrofracks is L. The block contains a contaminant, which may be assumed initially to be evenly distributed as to concentration throughout the block.

FIG. 7 shows two equations used for determining the rates at which the concentration of the contaminant will fall. The assumption is made that the concentration of contaminant is zero at the boundary of the block with the hydrofrack, as the molecules of contaminant undergo chemical breakdown.

Figure 8A:
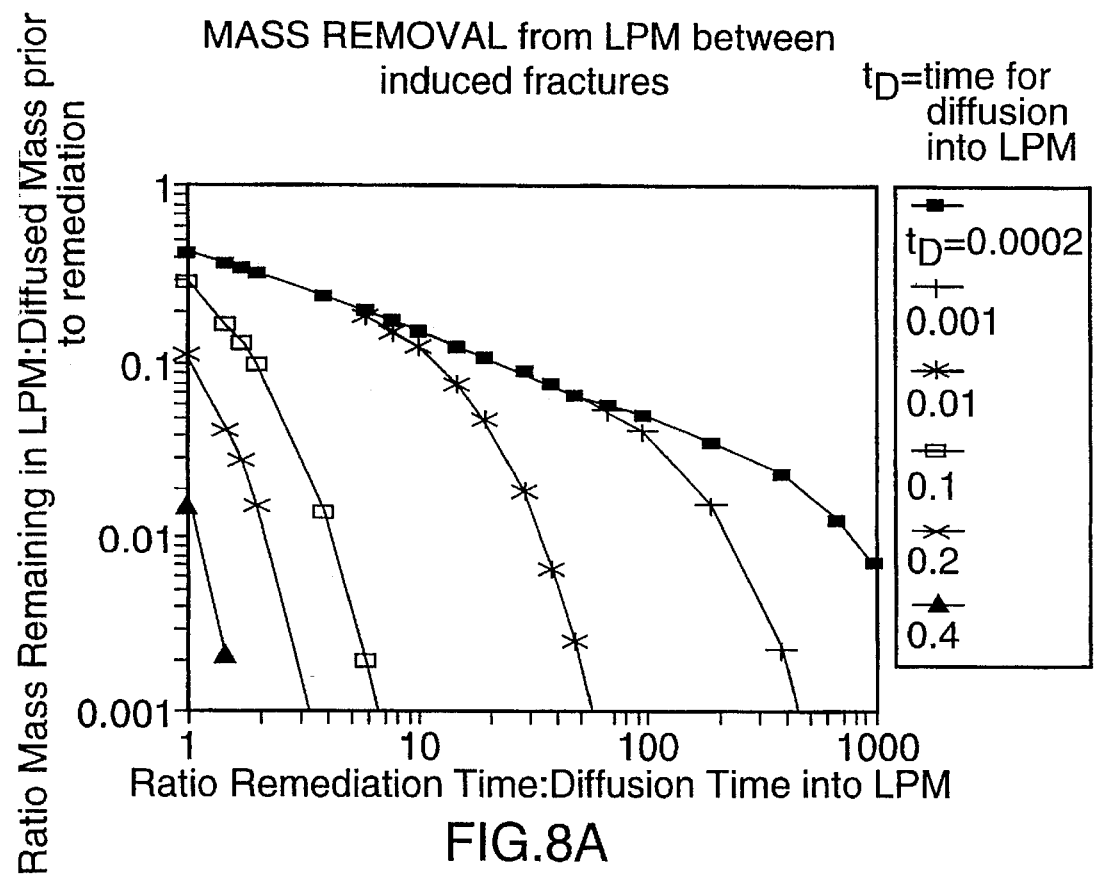
FIGS. 8A and 8B are graphs derived from the equations.
Figure 8B:
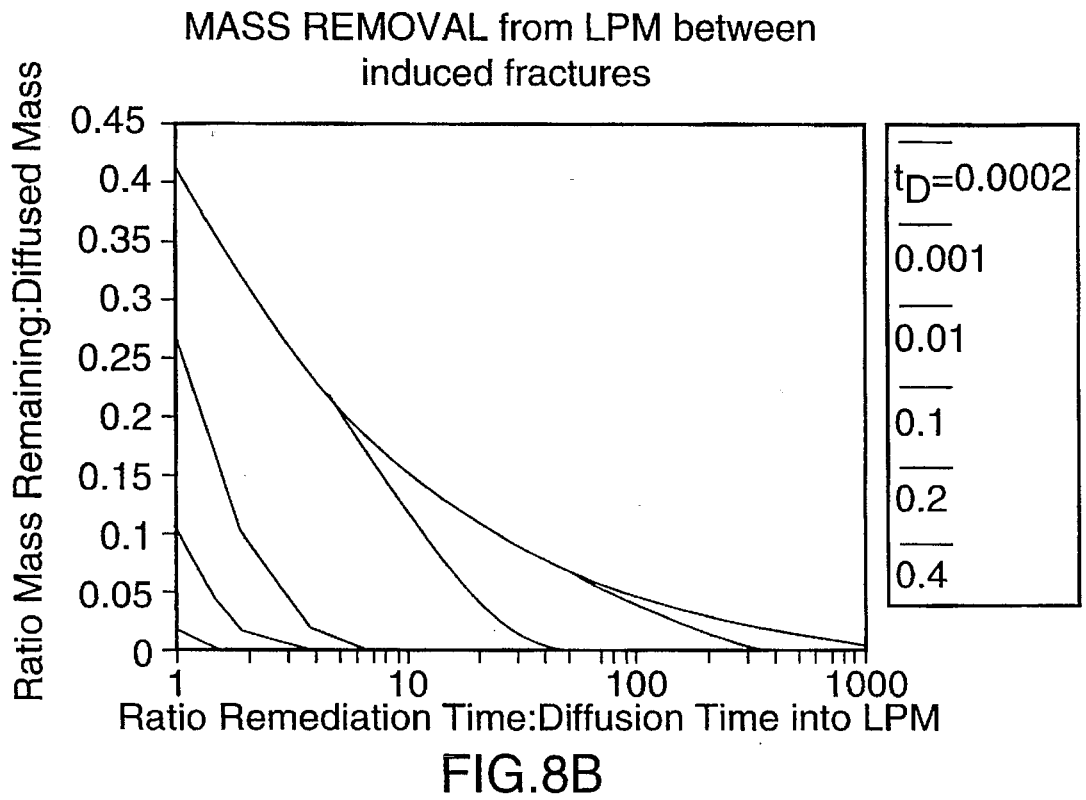

FIGS. 8A and 8B show graphs that may be drawn from the manipulation of these equations.

Figure 9:
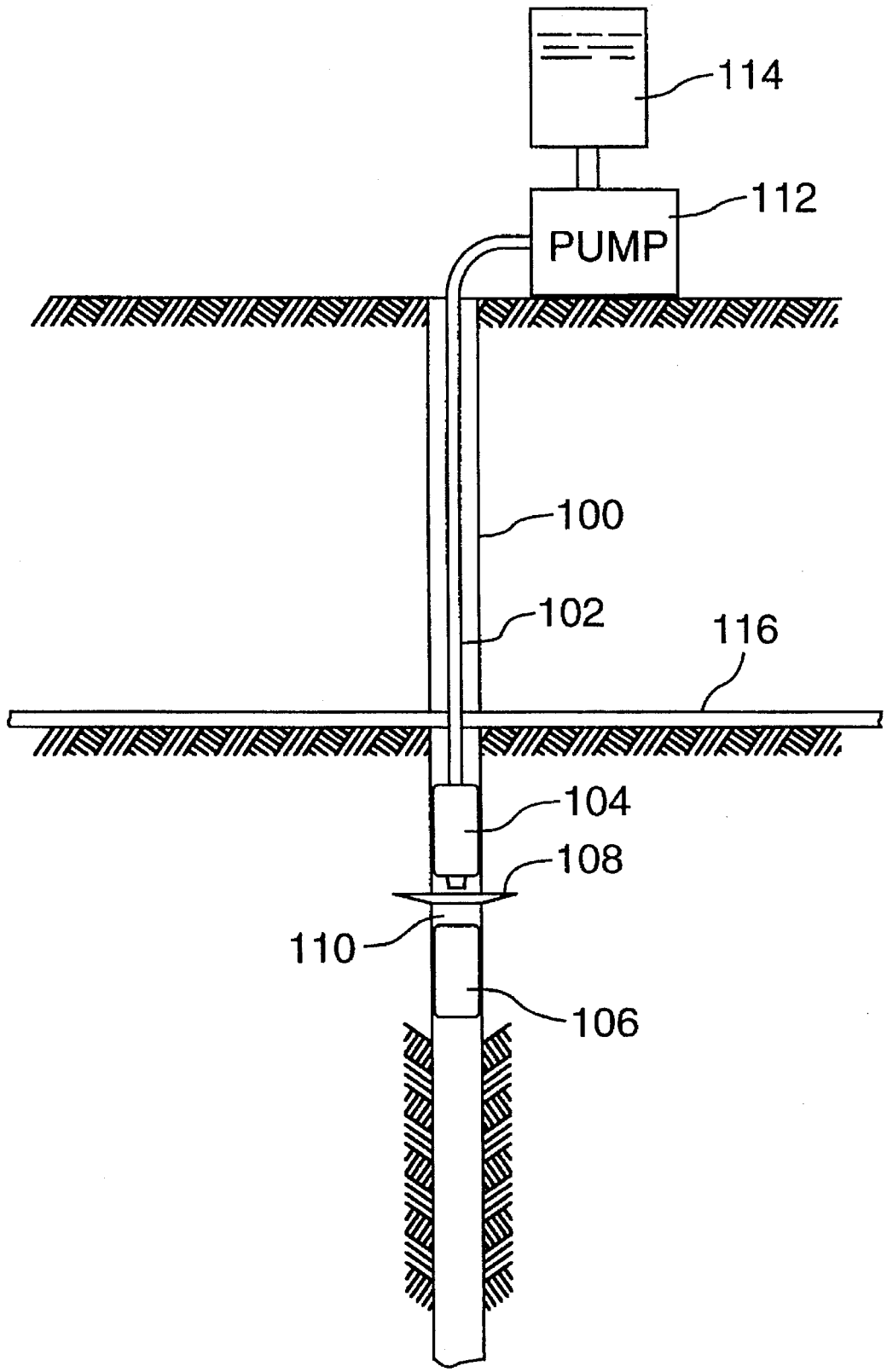
FIG. 9 is a cross-section of a borehole in which hydrofracturing is taking place.

FIG. 9 shows a borehole 100 in which a hydraulic fracturing operation is being carried out. A tube 102 has been inserted into the borehole, and upper 104 and lower 106 packers isolate and define an injection port at a particular depth of the borehole at which the fracturing is to take place.

The packers 104, 106 are of the conventional type which are inflatable from the surface. The packers are suitably designed and constructed so that, when inflated, they will withstand injection pressures, and prevent the injected fluid escaping into the borehole.

A notch 108 is formed in the sides or walls of the borehole; that is to say, directly in the low permeability material (LPM). The notch 108 is annular, and has a horizontal or radial dimensional extent of 5 or 10 cm or so, and a vertical or thickness dimension of 1 or 2 cm.

The notch 108 may be formed by means of a mechanical cutting or trepanning operation, or may be formed by a jet of a fluid, which cuts the notch into the LPM by erosion.

The apparatus and services needed for creating the annular notch are known to the skilled experts, and will not be described further.

Once the annular notch has been prepared, and the packers tightly sealed, the injection fluid may be pumped into the space 110 between the packers. The fluid enters the notch and the pressure of the fluid acts to open up the notch, thereby propagating a crack from the apex of the notch, radially outwards.

The injection fluid is pumped into the crack space 110 by means of an injection pump 112, located at the surface. The pump 112 is of the positive-displacement type, wherein the output flow rate remains volumetrically constant. Unused injection fluid is stored in a container 114.

As the fluid is pumped into the crack, the crack propagates radially outwards. This propagation continues until eventually the apex of the crack is so far away from the borehole that all the pressure energy that the fluid had when near the borehole is dissipated, and the crack can propagate no further.

The pressure in the fluid is dissipated by leakage of the fluid into pre-existing (or developing) nooks and crannies in the ground, or by friction and other losses of the fluid as it traverses outwards through the crack.

At some point, the leakage of the fluid into such nooks and crannies as are present, and the dissipation of the pressure energy, become large enough that the crack will propagate no further. Further pumping of the fluid then tends to make the fluid leak upwards, since that generally represents the path of least resistance. If pumping is continued still further, the fluid will eventually emerge at the surface, at some radial distance away from the borehole. The points of emergence of the fluid will not all be on a perfect circle, of course, because of inevitable non-homogeneities in the ground.

The horizontal extent or limit to which the crack can be propagated depends on the porosity and permeability of the low-permeability clay or rock material. If the ground is very impermeable, the crack can propagate radially for distances of several metres. In a case where the material is impermeable enough to support a very long crack, the pressure needed to propagate the crack over that very long distance can be considerable. However, it will be understood that only when the permeability is very low can such high pressure be developed.

For efficiency, pumping of the fluid should cease when the crack has reached its propagation limits as determined by the permeability of the LPM.

Leakage into the nooks and crannies takes a significant time, with the result that high pressure levels can be developed actually during the few minutes that the injection pumping is taking place, whereas the same pressure levels could not be sustained over, say, a few days, because the fluid would gradually pass into the LPM, since the LPM is never absolutely watertight.

When it has been determined that the fluid has been injected to the limits of effectiveness, ie that the crack has propagated as far as it will go, pumping ceases.

The effect of pumping the fluid into the crack has been to create a circle or disc (like that shown at 116, FIG. 9) of fluid of several metres diameter horizontally, and of a centimetre or two in vertical depth-or height.

It is required to place a number of such discs, one above the other, in the borehole. In that case, the upper and lower packers 104,106 are now deflated, and moved down (or up) to a new depth in the borehole 100. Here, the packers are re-inflated, a new notch is formed, and injection pumping is re-started. Another horizontally-extending disc of fluid is thereby inserted into the ground. Subsequent further discs of fluid may be provided at whatever depths and intervals the engineer may determine is suitable.

Figure 10:
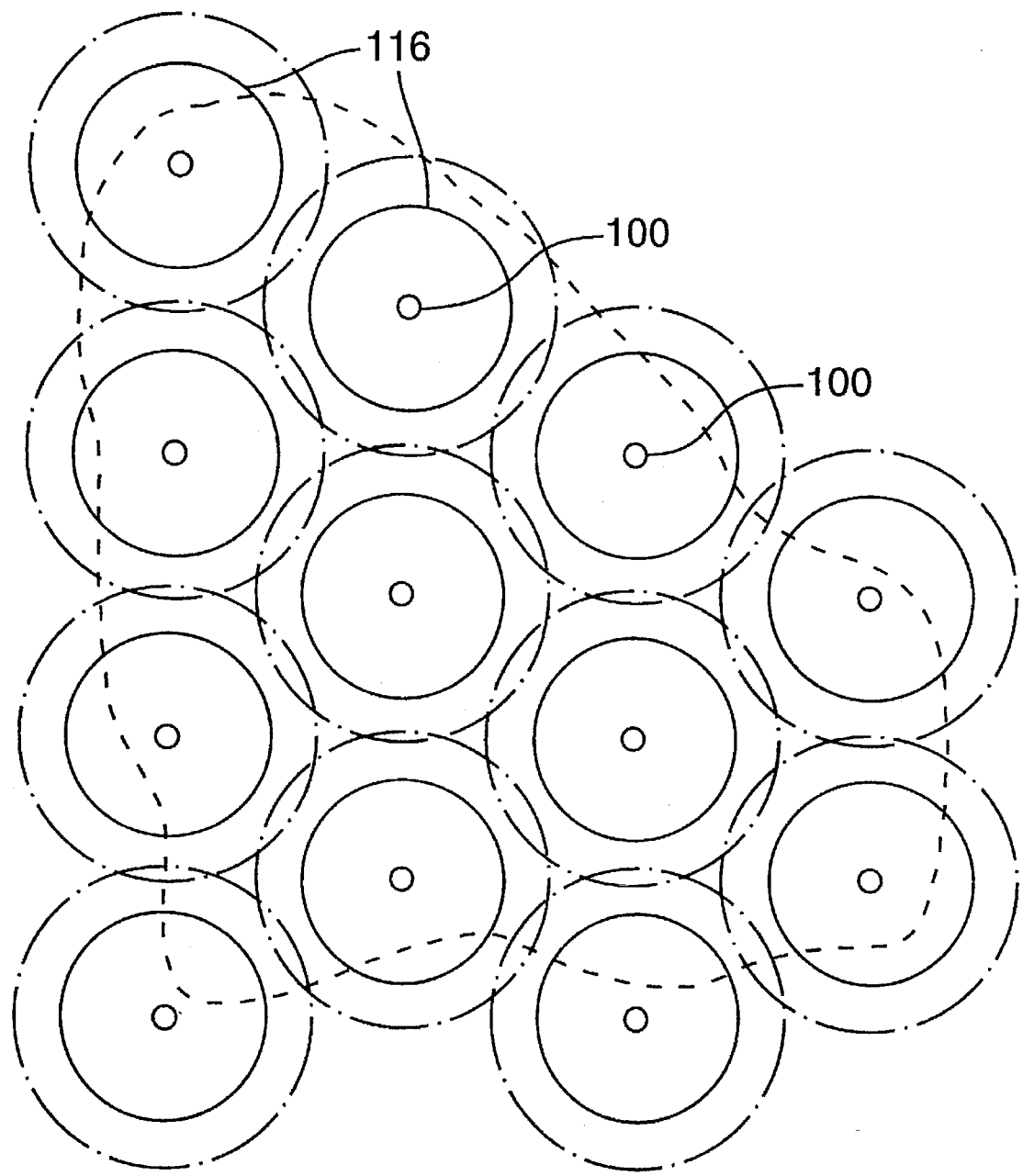
FIG. 10 is plan view of an area of ground containing many boreholes.

If the requirement is to treat the LPM of a large area (in plan) of the ground, several boreholes may be pitched over the surface of the ground at such spacings that the fluid discs injected from one borehole overlap the fluid discs injected from the adjacent boreholes, as shown in FIG. 10.

By this means, a large area of clay, rock or other LPM, and down to considerable depths, can be injected throughout all its horizontal and vertical extent with fluid containing a suitable treatment material—and in what is a highly economical manner.

The fluid used for hydrofracturing may have a gel consistency, and the solid particles are dispersed therein, whereby the solid particles are transported with the fluid into the crack. The gel may be such as to either dissolve or bio-degrade after injection. In fact, provided the molecules of the treatment material, and the molecules of the contaminant, can traverse therethrough, the fluid may remain as a gel.

It will be understood that only materials of a very low permeability, such as clay and rock, can enable the pressure to develop to a high enough value (several hundred psi) to cause the crack to propagate. In a sandy soil, for example, the fluid can escape easily into the spaces between the grains of sand, whereby large pressures cannot be developed.

It is recognised that the materials that allow artifical cracks to be induced and propagated are the very materials that, if contaminated, benefit the most from the injection of treatment materials into the cracks.

In a practical situation, the engineer carries out certain measurements and calculations. First, the engineer takes core samples from as many test boreholes as deemed necessary. From these, he determines the nature of the contaminant, the concentration of the contaminant in the blocks, the permeability of the block material, and the overall permeability including both the blocks and the cracks. He determines the extent to which the block is saturated with the contaminant. He measures the diffusion constants of the clay material, taking account of chemical mass partitioning and retardation factors.

The engineer also determines the nature of the treatment material with which it is proposed to break down the contaminant.

From these measurements and relationships, the engineer is able to determine a theoretical graph or curve, relating the time it takes to reduce the concentration of the contaminant, to the distance L apart between the treatment material and the contaminant.

Figure 11:
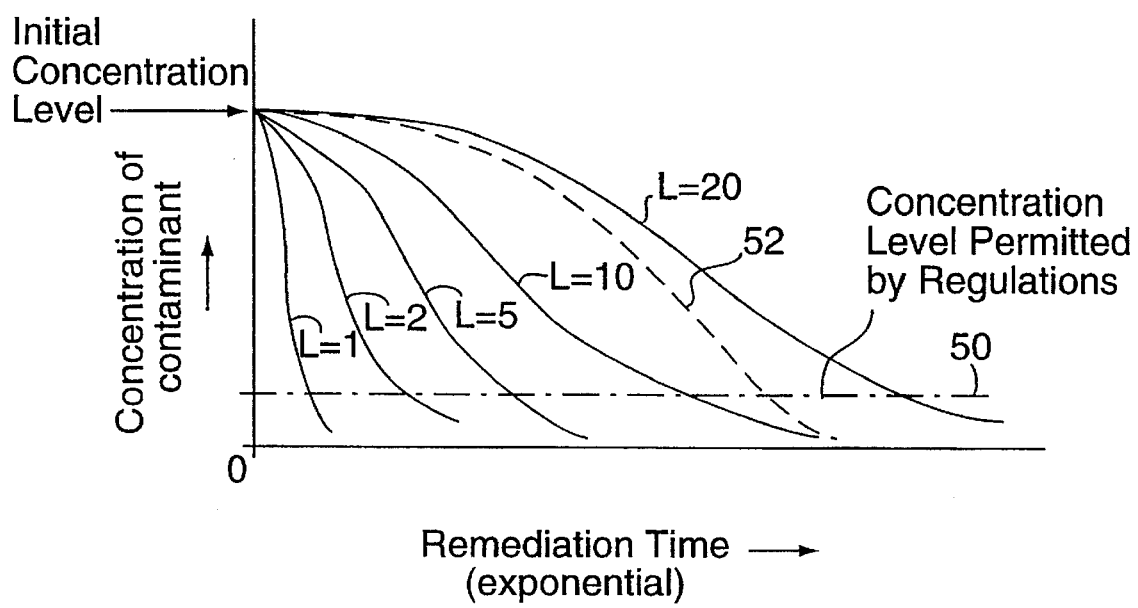
FIG. 11 is a further graph from which determinations can be made regarding the efficacy of the invention.

FIG. 11 shows a set of such curves, for different distances L. The engineer may insert a line 50 on the graph corresponding to the acceptable concentration level of the particular contaminant, as permitted by the regulations of the local jurisdiction. The engineer can now read off from the graph how long it will take (X-axis) to get the concentration (Y-axis) down to that level, for a particular distance L between the treatment material and the contaminant, on the basis that the mechanism by which the contaminant comes into contact with the treatment material is by diffusion through the block of LPM.

It will be understood that the time taken for complete remediation of the contaminant is somewhat arbitrary. One authority may require clean-up to be completed in one year, whereas another authority may allow five years. Also, the level of concentration of a particular contaminant which would be acceptable may vary: one authority regards 20 milligrams of contaminant per kilogram of soil as safe, whereas another authority may permit only 15 mg/kg of the same contaminant.

The engineer draws the graph of FIG. 11 for the particular contaminant, treatment material, soil conditions, etc, as appropriate to the local requirements and conditions, as determined by his measurements and calculations. He then enters the "political" requirements as to safe concentration, and time taken for remediation. The value of L, the required distance apart of the hydrofracks, can then be read off.

The purpose of the graph of FIG. 11 is to provide the engineer with a distance L, given the various inputs as described. It is recognised, in the invention, that such a graph not only can be drawn, but that the value it gives for L is accurate enough to be useful in a real case.

The engineer reads off the value of L, which indicates how far apart he should place the hydrofracks. Before actually carrying out the hydrofracturing operation, however, the engineer should determine whether hydrofracturing is appropriate at all.

Based on such factors as the actual permeability of the ground as measured in situ, compared with the permeability of an extracted sample of the ground, the engineer can make an assessment as to the average size of the blocks of LPM; or, in other words, he can assess the average distance between cracks, as it pre-exists naturally in the particular ground material.

The engineer may find that the natural cracks in the ground are already closer together than is indicated by the value L derived from the FIG. 11 graph. In that case, the invention would be contra-indicated. There would be little point in using hydrofracturing to break up the LPM into smaller blocks if the tests show that the blocks are already small enough that the contaminant can be extracted in a reasonable time. When the cracks are as close-spaced and as numerous as that, other means for getting treatment material into the cracks will usually be more appropriate than hydrofracturing.

However, if the distance L derived from the FIG. 11 graph is, say, twice the natural spacing of the already-present cracks, then it will be efficacious to employ the hydrofracturing as described. The engineer sets the vertical spacing V equal to the indicated distance L.

FIG. 11 also shows a curve 52. This curve represents the anticipated shortening (as compared with the L=20 curve) in the time it takes for remediation to be completed, in the event that liquid treatment material diffuses into the blocks of LPM, in pursuit of the contaminant.

The procedural steps for determining whether hydrofracturing is indicated, and if so, for determining the hydrofrack spacing distance, may be summarised as follows.

First, the engineer takes samples from the ground to determine the extent, nature, and concentration, of the contaminant. Possible treatment materials are considered, and one is selected which will cause chemical breakdown of the contaminant. Measurements are also taken to determine the size of the blocks, i.e the average spacing between the natural cracks.

The engineer assesses the size of the problem by taking measurements to indicate the concentration (CC-i) of the contaminant at an interior point of the LPM block, located a distance L from the nearest point on the boundary of the block.

From the samples, the diffusion coefficient of the LPM can be measured, i.e the passive diffusion rate of the contaminant (PDR-C) at a point in the LPM block, being the rate at which the concentration of the contaminant at the point changes over time as a function of the concentration gradient of the contaminant (CG-C) at that point.

The engineer determines that conditions are suitable for passive diffusion of the contaminant towards the boundary of the block to take place: if there is a significant movement of water through the block of LPM, for example, that movement might mask or swamp the diffusion movement; or if a second contaminant is present, that might affect the diffusion movement of a first contaminant.

The engineer assesses whether the size of the blocks, as pre-existing in the ground, is so large that in order to get treatment times down to an acceptable period, the blocks will have to be broken up.

If all the indications from the measurements and calculations, and in particular the diffusion characteristics, are such that hydrofracturing is indicated, the engineer prepares a graph or other mathematical model, comprising a plot of the relationship between safe level for the contaminant, time taken for remediation to that safe level, and block size. The engineer then proceeds with hydrofracturing, using the spacing as required to achieve the indicated block size.

Remediation then proceeds as the molecules move towards the treatment material, and are broken down. The movement of the contaminant is due to diffusion: when the particular conditions are established as described, there is no need for the water to be moving. The system is thus entirely passive, once the hydrofracturing has been done.

As mentioned, sometimes it may be advantageous to refresh the treatment material periodically. Even if periodic refreshment is done, that does not take away from the fact that during the long periods during which the remedial treatment is actually taking place, the water is not required to flow, nor is there any need for energy input. The treatment material may be refreshed if it should be of the type that leaches away or dissolves slowly, or gradually loses its effectiveness.

Destruction of contaminants takes place with no influence or assistance from fluid flow in the LPM blocks or in the hydrofracks. Fluid flow takes place in the hydrofrack only when the fresh treatment fluid is injected into the hydrofracks. This injection occurs quickly, in a day or so, once in a while; for example, every few months or years. Thus, the system is nearly entirely passive. Even in a system where refreshment takes place periodically, energy (for injection) is used sparingly.

The treatment material may be solid or liquid. If liquid, the treatment material may diffuse into the LPM block, and "chase" the contaminant. In that case, in effect, the distance L the contaminant has to travel, by diffusion, before it reaches the treatment material, is reduced by the distance the treatment material has travelled into the block.

Preferably, when the treatment material is liquid, the hydrofracks are held open by a proppant such as sand. Then, if refreshment of the treatment material should become necessary, an injection of the fresh material can be done simply, at low pressure, and without re-hydrofracturing.

As to the kinds of breakdown reaction that may be promoted through the invention, it may be noted that some of the chlorinated organics, including solvents, pesticides, etc, can be broken down by close contact with a metal such as iron, by a reduction reaction. Other types of contaminants can be broken down by oxidation; the oxidizing agent may be a solid, or a liquid, either a non-aqueous phase oxidizing liquid, or an oxidant that dissolves in the water. Breakdown reactions are of many types: for the invention to be applicable, the reaction should be one in which the contaminant is chemically broken down into relatively harmless substances.

The invention is only available when the reaction is a breakdown reaction. If the treatment system were of the kind that leaves the contaminant intact—if the treatment involves the contaminant being adsorbed onto a sorbent of some kind, for example—the concentration of the contaminant then is not reduced upon being brought into contact with the treatment material, and the concentration builds up. The concentration gradient consequently falls, and the rate of travel of the contaminant out of the block, due to diffusion, slows down.

By contrast, in the invention, the concentration of the contaminant drops, in the vicinity of the treatment material, because the contaminant is broken down by chemical action there. Because the concentration drops, a concentration gradient is established and maintained between the contaminant and the treatment material, throughout the treatment period.

The invention is contra-indicated in a case where the contaminant, upon breaking down, forms a substance which may be harmless in itself, but which precipitates a coating on the grains of the treatment material, and thereby prevents effective contact and the subsequent breakdown of the contaminant.

The invention is efficacious when the treatment material is a catalyst, which remains unchanged over long periods while the contaminant is broken down.

The invention is efficacious when the contaminant, upon breaking down, forms a substance which remains immobile, even if the substance may be toxic in itself.

To illustrate the importance of the distance between hydrofracks for determining the time to achieve clean-up, the following example is provided. For a particular contaminant mass to be removed by diffusion from a 5 metre thick zone of clayey material (i.e 5 metres between hydrofracks) 920 years will be necessary. With the same soil material, and the same contamination, but with placement of hydrofracks with treatment particles at 1 metre spacing, the clean-up time is reduced to 37 years. If the distance between hydrofracks is diminished to 10 centimetres, the clean-up time is reduced to 0.4 years.

The in-situ treatment processes as described function effectively without induced or natural water flow. The design engineer makes no provision for flow except on the rare occasion when material is injected into the hydrofrack for replenishment of the treatment chemicals. No electrical currents or forces are used. No hydraulic pressures are imposed on the soil material to cause water to flow out of the soil, carrying contamination with it. By avoiding the imposition of electric current, heat, or continual fluid pressures, the engineer avoids the cost of these energy inputs which makes the invention an economical system for clean-up of low-permeability deposits in situations where excavation of the deposits is not economically feasible.

The design engineer chooses the invention for use at sites where tests for the permeability of the contaminated soil or rock show that imposition of energy, such as electrical current, heat, or water pressure is not a practical means of causing movement of water or contaminants in the matrix material.

There are very many industrial sites where these low-permeability conditions exist and where regulations require restoration of the contaminated soil or rock.

Passive diffusion, in the context of the invention, means diffusion that takes place naturally, and in the absence of bulk or bodily movement or velocity of the water relative to the LPM. That is not to say that the water must be completely still. In a real situation, the water may happen to have a detectable or measurable movement (as is not uncommon due to natural in-ground pressure gradients) and the invention may be applied in that case. But a forced flow of water that requires pumping or other forceful stimulation of flow, through the application of energy, is outside the invention.

A variation of this invention involves installing containment walls to control the flow of upgradient (clean) groundwater flowing through the area (hydraulic control structures in FIG. 3).

Another version of this technology is to use hydrofracks (blasting or pneumatic fracturing) to create a permeable zone for groundwater to flow through at its natural rate and contaminants be degraded or detoxified as they pass through. Since the engineer knows how to calculate the rate of mass migration away from the source zone to outward diffusion, they can determine the time required for treatment required in the reactive permeable wall, time periods required for reactant material replenishment for the liquid degraders.

Figure 12B:
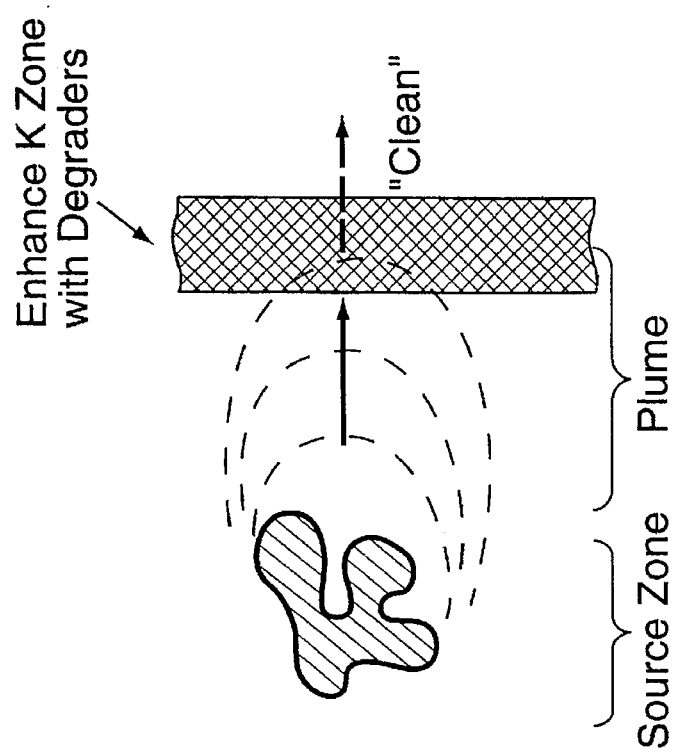
FIGS. 12A and 12B are a cross-section and a plan of another area of contaminated ground.
Figure 12A:
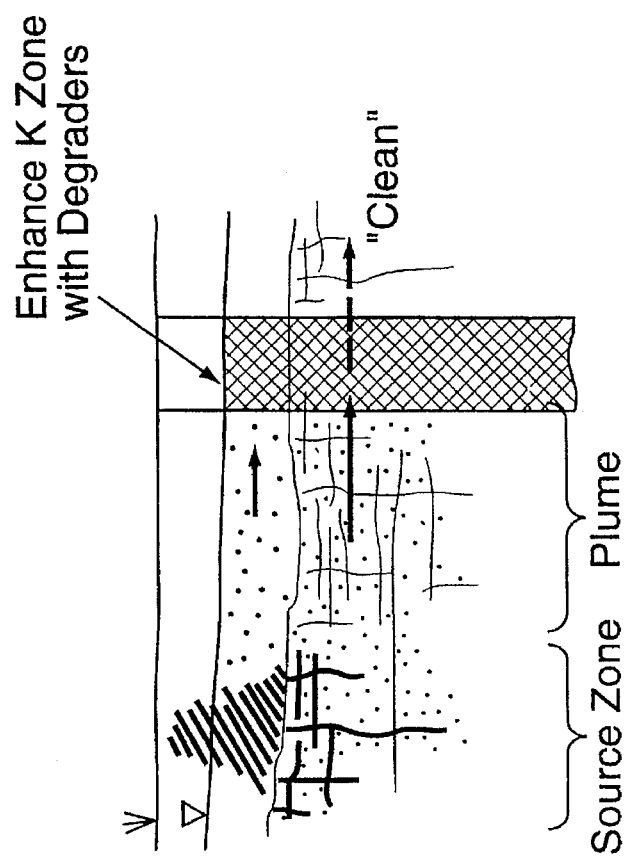
Figure 13:
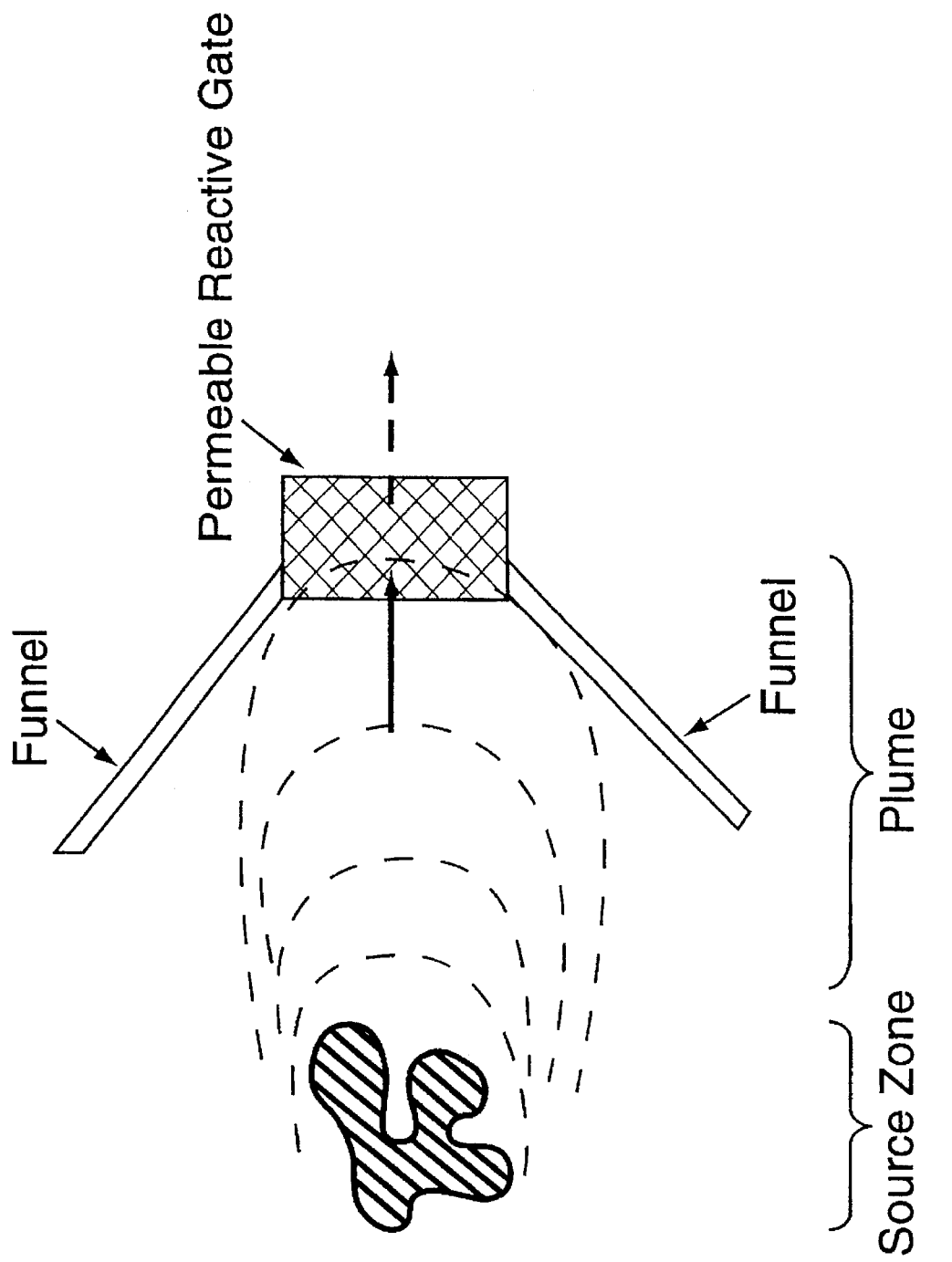
FIG. 13 is a plan view of a further area of contaminated ground.

Another version includes injection of sealants in induced fractures that are used to better connect existing fracture networks for groundwater flow control, redirection through the reactive gate etc. Another version is the injection of reactant materials transverse to the diffusion migration path around low K contaminant structures (landfill liners, barriers, etc.). (FIGS. 12A, 12B, and 13).

It should be noted that, when it comes to determining the natural spacing apart of natural cracks and fissures in the ground, the accuracy of the determination can be rather low. It may be difficult to tell, in some cases, from borehole samples and comparisons with in-ground tests, whether the blocks of clay average 2 metres between cracks, or ½ metre between cracks.

It is contemplated, therefore, that hydrofracturing would still be carried out, even though the mathematical model showed that the naturally existing blocks were already small enough. The prudent engineer would be reluctant to place too much trust in the methods of measuring and deriving the average spacing of the natural cracks.

Further points relating to the technology shown in FIGS. 1–3 may be described as follows. This technology is suitable for cleaning up organic contaminant zones in fractured clayed deposits or fractured sedimentary rock. Fractures are induced by pneumatic, hydraulic or explosive techniques within contaminant source zones in lithified or unlithified low permeability deposits. A schematic diagram of induced fractures is presented in FIG. 1. Increased frequency and interconnectedness of fractures in low permeability deposits will effectively reduce matrix block sizes (dimensions of the low permeability zones between advection pathways), which increases the surface area over which diffusion can occur to enhance contaminant mass destruction or removal rates from the low permeability matrix blocks. In-situ chemical or biological degraders (and associated nutrients) injected into the fractures can be used as in-situ reactants to degrade the contaminants (refer to FIG. 2a). The enhanced fracture zone will facilitate the injection of these chemical/biological degraders throughout the zone of contamination.

These in-situ degraders may be either injected during the fracturing process (possibly as a solid proppant material in the case of reactive solids such as zero valent iron solids (iron filings), or reactive fluid with or without proppant) or subsequent to fracture creation using injection wells or galleries. The injected reactants (degraders) are then in place adjacent to the low permeability zones to degrade contaminants as they are released from the matrix by reverse diffusion and desorption processes. In some cases, the destruction of the contaminant will only occur within the fractures where the chemical or biochemical reaction materials reside (FIG. 2a). In other cases, the reactive chemicals will be mobile (dissolved reactive species such as $KMnO_4$, $H_2O_2$, $O_3$ etc.) and will migrate into the matrix by diffusion and hence "chase" after the contaminants in the low permeability zones (diffusive chasers), further enhancing the rate of contaminant degradation. This is illustrated in FIG. 2b. Diffusive chasers offer the best possibilities for most rapid destruction of organic chemicals both in the fractures and in the matrix material.

In cases where the reactive chemicals causing contaminant destruction are solid-phase materials (i.e. solid particles), the particles injected into the fractures will be immobile in the fractures even when groundwater flow occurs. This will generally be desirable because the contaminant destruction process caused by the particles continue to occur for considerable time once the particles are in place (long reaction life). In some circumstances the injected solids will provide a source of dissolved-phase degrading compound which will result in the solid phase slowly dissolving away. In other cases, the chemicals causing contaminant destruction will be fluids injected into the fracture network. The fluids will invade the natural fractures as well as the induced fractures. The injected fluid will gradually be flushed from the fracture network. In some circumstances, natural groundwater flow will flush the reactive fluid out of the contaminated zone at an excessive rate in which case the reactive fluid has insufficient opportunity to cause adequate destruction of contaminants before being flushed away. This problem of insufficient residence time for the reactive fluid can be overcome in various ways, one of which is the provision of a low-permeability barrier around the zone to prevent or reduce groundwater flushing (refer to FIG. 3). Numerous technologies are available for creation of such barriers. Once the barrier enclosure is in place, the fracture network inside the enclosure can be filled with the reactive fluid by injection into the induced fractures. As the reactive capacity of the fluid (or soluble solids) is consumed by reaction with contaminants and natural constituents, it is replenished by repeated injections.

Some key points about the FIGS. 1–3 technology may be summarised as follows.

1. Injection of solid-phase reactive materials (particles) for contaminant destruction into induced fractures for the purpose of destroying contaminants in-situ at a rate that is much more efficient than can be attained from flushing technologies for removal of contaminants since these passive technologies allow the degradation/immobiliziation to occur at rates compatible with the transport rates controlling their removal from low-permeability zones. The solid-phase reactive materials cause contaminant destruction when contaminants contact the material. Contact occurs when contaminants diffuse from the matrix to the reactive materials. In this approach, reactive proppants are used in addition to or in place of the inert proppants used in conventional hydrofracturing. The induced fractures with the reactive materials are therefore positioned to provide short diffusion distances from the matrix and large surface areas for reaction. It is not necessary that the induced fractures filled with reactive material provide an increased bulk permeability to the geologic media. In some instances, permeability increase is not preferred.

2. For some types of contamination, the injected solid-phase materials will release dissolved reactive chemical species that will diffuse into the matrix causing contaminant destruction within the matrix. In this circumstance, diffusion of contaminants out of the matrix into the fracture is not the rate limiting step because destruction of contaminants occurs in the matrix.

3. For some types of contaminants the most effective approach is to inject non-reactive particles (proppants) into the fractures to provide enhanced permeability pathways. Then, fluids comprising reactive chemicals are injected into the proppant-filled induced fractures (and hence, also into many of the natural fractures connected to the induced fractures). Dissolved reactive chemical species from the injected fluids diffuse from the fractures into the matrix, thereby causing contaminant destruction within the matrix and in the fractures. If required, multiple injections of reactive fluids can be performed to replenish the reaction fluids, or to perform post-reaction flushing as a polishing step.

4. Various combinations of the three approaches outlined above can be used in sequence or in combination to destroy groups of contaminants, or to achieve destruction in a manner evolving from bulk cleanup to polishing steps.

5. With each of the above-mentioned approaches, the in-situ destruction of contaminants can be made to occur either by chemical reactions (abiotic) or microbiological processes (biotic). For biotic destruction the reactive particles or injected fluids supply energy or nutrients to natural bacteria in the geologic medium, causing contaminant destruction to occur in the fractures or in the matrix.

6. As new reactive particles or fluids for destroying various types of contaminants are identified, they should be evaluated for their application as passive degraders, diffusive chasers, or proppants.

Further points relating to the technology shown in FIGS. 12–13 may be described as follows. The permeable walls or gates can be installed to degrade plumes in fractured bedrock or fractured cohesive deposits of silt/clay using artificial fracturing techniques as illustrated in FIGS. 12a, 12b, and 13. Induced fractureing techniques are used for creating an enhanced permeability zone and for injecting chemical/biological degraders into a permeable treatment zone where dissolved contaminants are degraded as they are transported through. This use of permeable treatment zones is unique in that it can be installed across contaminant plumes in fractured rocks and cohesive clay-rich soils not proposed previously in the literature. Blasting, pneumatic and hydraulic fracturing techniques can be used to create the high permeability zone (not for hydraulic control through pumping and above ground treatment, but rather for creating a subsurface treatment zone which is well-connected to plume migration pathways in order to intercept and degrade the contaminants as they pass through).

In the version of the funnel-and-gate system for treating plumes in fractured geologic media, a vertical zone or wall of reduced permeability (the funnel) is created across segments of the plume to guide, funnel or converge the plume into narrow reaction zones (gates) in which the plume is treated while flowing through the gate. The funnel segments can be created by conventional means involving injection of sealants into boreholes. The sealants move from the borehole into the natural fractures connected to the boreholes. In conventional practice it is commonly difficult or impossible to seal a sufficient percentage of the natural fractures to prevent excessive movement of contaminants through the injection zone. We propose the use of induced horizontal and sub-horizontal fractures to enhance interconnectedness of fractures prior to grouting in order to achieve the very low permeability zones required to funnel contaminants to the gates. The induced fractures with or without proppants are created and sealants are injected into boreholes connected to the induced fractures. The induced fractures will create new hydraulic interconnection with existing fractures and facilitate the injection and distribution of sealants in both induced and naturally occurring fractures in the system. Injection of the sealant into the induced fractures provides a much better opportunity for all significant natural fractures as well as the induced fractures to be invaded and therefore sealed. Various sealants are available, such as the well known cement-based seals used in the rock grouting industry and organic chemical (polymer) sealants used in the petroleum industry. Most sealants for injection into fractured geologic media are much less expensive than the reactive materials that can degrade or immobilize contaminants in the gates. Therefore, there are costs advantages to be gained from injecting sealants across part of the plume to form funnels and reactive materials across the remaining width of the plume rather than injection of reactive materials across the entire plume.

Some key points about the FIGS. 12-13 technology may be summarised as follows. This technology addresses plumes in rock and cohesive heterogeneous deposits where natural flow pathways are more complex and fracturing (by any means) allows for interconnecting these pathways and provides a method for ensuring contaminant path lines pass through the treatment zone.

2. Multiple curtains or gates can be in installed in series if various degradation reactions were required for the contaminant mixture or polishing steps were required for improved water quality in the aquifer.
3. Enhances distribution of reactants across plume cross-sectional area. (passive or semi-passive approaches applied depending on the nature of the chemical/biological reactants)
4. In-situ treatment avoids continual operations of above ground treatment systems, associated permitting requirements and discharge of treated waste stream
5. Passive technologies can reduce the total volume of water to be treated compared to conventional pump and treat, especially as more and more of the plume contaminant mass is emanating from the low-permeability zones due to desorption and reverse diffusion. The contaminants migrate under natural gradient conditions toward the curtain where the reactants are placed and well-distributed for degrading the contaminants.
6. A special case for installing a continuous fractured zone exists for unlithified clay-rich deposits using the Canadian hydraulic fracturing technology which allows for augering and injection of proppants with one pass down the borehole and fractures could be created in a helical screw fashion (see FIG. 4).

Further points relating to the FIG. 5 technology may be described as follows.

At existing sites, artificial fracturing technology can be used to create defined treatment zones surrounding existing source zones, waste landfills or other impoundments. Refer to FIG. 5. With available induced fracturing technology, chemical degraders can be injected at targeted depths below the waste pile or landfill and create a reactive bottom (and sides) to degrade chemical constituents as they slowly migrate by diffusion (and possibly advection if hydraulic gradients are in the direction away from the containment structure into the subsurface environment) away from the waste. This would allow containment of chemical fluxes due to diffusion, not just advective fluxes which is what low-permeability cut-off wall/containments system designs address. FIG. 5 illustrates the use of vertical drill holes for performing successive horizontal fractures with depth. The complete fracture distribution would include interwoven fractures in a horizontal plane and over a few metres thickness. The emplaced chemical degraders within the induced fracture zone will act as a chemically reactive barrier to contaminants migrating by molecular diffusion.

Some key points about the FIG. 5 technology may be described as follows.

1. Hydrofracturing technology is used to inject chemically reactive materials to passively degrade chemicals emanating from low permeability liners or containment structures around landfills, source zones, etc. which allow contaminants to be released to the environment by molecular diffusion.
2. The installation of reactive barrier zones (down-chemical gradient) of contaminant source areas can be performed pre- or post-containment structure construction.
3. The fracturing technology is used as a means for distributing the chemical degraders in a controlled manner to create interlocking/overlapping fractures containing chemical degraders (targeted depths and overlapping fractures can be predicted according to fracturing technologists).
4. If a wide variety of contaminant species are of concern, multiple barrier systems can be injected/installed at different depths and lateral distances from the source to treat various contaminants in series (treatment train).
5. Reactive barriers can be injected at any desired distance away from the source of contamination (i.e. close proximity to the source or closer to down-gradient receptors) depending on health, environmental and economic factors. This offers flexibility in locating the passive/semi-passive in-situ degradation system to avoid complications with site operations or infrastructures (utility lines, etc.).

A key benefit of injecting the treatment material into the LPM, in-situ in the ground, is that the LPM itself does not have to be removed from the ground. Excavating large quantifies of contaminated clay from the ground and transporting the clay to a disposal site, which is the conventional procedure, is enormously expensive; and the difficulty remains even then that the contaminant has not changed form into a non-hazardous state such that the contaminants mobility and persistence is the environment is still of concern.

When pumping of the fluid ceases, the crack in the LPM starts to close up, but much of the fluid remains in the crack, and, in particular, much of the solid particles suspended in the fluid tends to remain in the crack. The split particles, in fact, serves, or can serve, to prop the crack open. In fact, propping the crack open is not particularly advantageous in some uses of the invention, since there is no real benefit in these uses, for the purposes of treating contaminants in the LPM. Therefore, if the solid reactive particles of the treatment material can be constituted in such a way that the forces from the closing crack tend to mechanically squeeze the particles into the soil or rock along the crack, allowing the crack to close partly or completely, then so much the better.

However, even though some of the particles may be washed out of the crack, and even though there may be other departures from the ideal, the system as described remains a highly effective and economical way of treating contaminated LPM. The constitution of the particles should be such that, considering the size of the cracks, the velocity of water flow, etc., that the particles are not simply swept out of the cracks.

The invention is also concerned with cracks that are created by hydraulic fracturing or other types of fracturing that are used for injection during or after fracturing of reactive liquids for treatment of contaminants in the LPM. In situations where the natural movement of groundwater through the induced cracks and natural fractures is slow, the reactive liquid injected into the cracks and fractures remains there for a long time. Chemicals in the liquid treat contaminants in the cracks and fractures and, as well, invade the low-permeability matrix of rock or soil and cause treatment therein. Eventually, the reactive chemicals are consumed, or spent, and a new batch of reactive liquid is injected into the subsurface zone. The time between injections can be long, so that this method of treatment involves only occasional work and low cost (i.e. the method is semi-passive). In these cases where reactive liquids are used for treatment, solid particles are nevertheless injected into the cracks when the cracks are formed to keep the cracks open so that the liquids can be injected when needed at later times.

However, the invention is concerned primarily with the type of solid treatment material that is suspended in solid particles in the injection fluid, and is substantially insoluble in water. The fluid may be water or water with additives to provide a consistency better suited for carrying the slid particles. The solid particles are dispersed therein, whereby the solid particles are transported with the fluid into the crack. The fluid may be such as to either dissolve or chemically or biologically degrade after injection.

The type of treatment material that is suitable for use in the invention is the type that will be effective to carry out the treatment reactions when injected into small spaces. Solid particles that will cause treatment reactions in the subsurface to remain effective for a long time are preferred, however in some cases, combinations of reactive solid particles and reactive liquids can be effective for treatment. The reactive liquids can cause treatment through chemical or biochemical reactions, or biological processes.

The invention is ideal for non-biological chemical treatment processes; for example, the use of metal particles in the treatment of chlorinated hydrocarbon contaminants, as described in patent publication WO-91/08176 (GILLHAM). The metal is in particles (eg. iron fillings) which may be suspended in a fluid gel, and injected. After a few days, the gel disappears, leaving the metal particles dispersed widely and thoroughly through the LPM. It can be expected, if the procedure has been properly planned and executed, that the contaminant will be gone from the LPM near the cracks in a few years. It will be noted that no on-going service or attention is required during the treatment time, other than a periodic inspection and evaluation.

The Gillham invention uses iron filings to treat chlorinated hydrocarbon contaminants. Some of these contaminants can be treated by other particles such as the iron sulfide minerals: (i.e. pyrite). Particles of minerals can be used in a combination with iron filings or as separate treatment material.

Another example is the use of solid particles that release oxygen to groundwater for treatment of the common contaminants, such as benzene, ethylbenzene, toluene and xylenes (BTEX), derived from petroleum products in groundwater. The oxygen released into soil or groundwater causes natural bacteria already existing in the subsurface to degrade BTEX and many other organic chemicals. It has been proposed to use a powder of magnesium dioxide formulated to provide release of oxygen into groundwater at a rate suitable to cause degradation of BTEX. The oxygen dissolved in groundwater in the cracks would cause degradation of the organic contaminants in the cracks. Also, the dissolved oxygen would diffuse into the low permeability matrix to cause degradation therein.

Another example is potassium permanganate ($KMnO_4$), which causes destruction, by chemical oxidation, of some chlorinated hydrocarbon contaminants.

Potassium permanganate can be injected into cracks as solid particles or solubilized in liquid. It causes destruction of the chlorinated organic chemicals in the cracks and by diffusive invasion into the matrix.

It will be understood that only materials of a low or moderate permeability, such as clay and slightly fractured rock, can enable the pressure to develop to a high enough value (several hundred psi) to cause the crack to propagate. In sand, for example, the fluid can escape easily into the spaces between the grains of sand, whereby large pressures cannot be developed.

It is recognized that in fact the materials that support crack propagation are the very materials that, if contaminated, benefit the most from the injection of treatment materials into the cracks.

Described above are three technologies for removing contaminants from low-permeability unfractured or naturally fractured geologic media (the latter category is also referred to as dual-porosity/dual permeability media), where molecular diffusion plays a major role with the distribution of contaminant mass. The technologies are unique in that they are specifically designed to address the contaminant mass in the low-permeability zones where the contaminant mass transport and removal is controlled by molecular diffusion, which is the movement of dissolved chemicals in water and air due solely to concentration gradients of the chemicals. The three "inject and leave" technologies address either source zone clean-up and/or plume migration control and remediation using passive or semi-passive in-situ destruction or immobilization techniques in a manner consistent with mass transfer rates by reverse diffusion and desorption from the low-permeability zones within geologic media. These technologies are more efficient than forced-gradient advection technologies (i.e. groundwater pumping or vacuum extraction) since they are designed to operate consistent with the rate-limiting steps of diffusion and desorption from the low-permeability zones.

The technologies involve destruction or immobilization of the contaminants in situ using chemical or biochemical means by injecting chemical reactants into the subsurface utilizing induced fracturing technologies, and leaving in-place for degradation or immobilization of contaminants to occur at natural advection and diffusion transport rates. The destruction occurs at a rate that is made relatively rapid by appropriate placement of chemically or biochemically active materials, using engineering methods, within the zone of subsurface contamination or across the expected path of contaminant migration. The distribution of the reactants is facilitated by the use of induced fracturing techniques either for the simultaneous or subsequent injection of the reactants. In some situations, the distribution of the in-situ degraders is further enhanced by the ability of the in-situ degraders to diffuse into the low-permeability zones (diffusive chasers)

which decrease the time frame required for contaminant destruction or immobilization to occur. In cases where advection through the treatment zone is enhanced and not desirable, the induced fracturing technology with injection of sealants is proposed to control the transport rates through the treatment zone either in the "funnel" context or the containment wall design, A special case technique for continual fracture propagation and injection of reactants is also describe which is a highly efficient method for enhanced fracturing and reactant injection in unlithified deposits.

The objective of the induced fracturing techniques with the three proposed technologies improves the distribution of reactants into newly created and previously existing fractures getting the reactants in closer proximity to the contaminant maw which will be slowest to be removed. These technologies are NOT dependent on increased fluid permeability of the geologic medium for active flushing of the zone using water or vapor (air), however, increased permeability within the zone of treatment may enhance subsequent reactant injections. This contrasts the current use of induced fracturing for shallow subsurface remediation which is to use induced fractures to enhance the bulk fluid movement of air or groundwater through the contaminated zone (advection). This approach does not enhance the mass removal rates from the diffusion controlled environments and is not efficient in that these technologies are not designed with regard to the rate limiting mass removal processes involved. The use of induced fracturing in the petroleum industry for oil and natural gas extraction from reservoir rocks is also used to facilitate the bulk fluid movement (advection of fluids) to the surface. Surfactants and colsolvents are also being used in conjunction with fracturing techniques in the petroleum industry for mobilizing the immiscible-phase mass by altering the fluid properties to enhance bulk fluid movement for removal from the subsurface.

The contaminants that can be destroyed or immobilized by the chemical or biochemical processes include both organic and inorganic chemicals ranging from halogenated and non-halogenated organic chemicals to metal and non-metal ions. These contaminants may be present in the subsurface because of natural source or emanating from manmade sources such as waste piles, lagoons, septic systems, or released to the subsurface environment through leaks, and spills. In some cases, such as the organic chemicals, the contaminants are destroyed or removed by chemical or biochemical reactions. However, with inorganic species, the contaminants are immobilized or altered to prevent their migration or adverse impact to the groundwater receptors.

We claim:

1. Procedure for treating contaminated groundwater, including the steps of:
   taking a sample of the ground containing the contaminated groundwater;
   establishing the nature of the contaminant, and selecting a suitable treatment material;
   proceeding with the following steps responsive to the selected treatment material being of the kind that will bring about a chemical breakdown of the contaminant when the contaminant is located, at a point of breakdown, in close physical proximity to the treatment material, being breakdown of the kind wherein: (a) the contaminant is chemically converted into a relatively non-contaminating substance, (b) the concentration of the contaminant at the point of breakdown is substantially depleted by the breakdown, and (c) the effective concentration of the treatment material at the point of breakdown is unaffected or affected only very slowly by the breakdown;
   determining the nature of the ground, and proceeding with the following steps responsive to a determination that the ground comprises large blocks of low permeability material (LPM), and the large LPM blocks are intercalated with cracks or other zones of higher permeability;
   determining the concentration (CC-i) of the contaminant at an interior point of the LPM block, located a distance L from the nearest point on the boundary of the block;
   carrying out measurements and calculations to determine the passive diffusion rate of the contaminant (PDR-C) in the LPM block, being the rate at which the concentration of the contaminant at the point changes over time as a function of the concentration gradient of the contaminant (CG-C) at that point;
   providing conditions whereby passive diffusion of the contaminant towards the boundary of the block can take place;
   proceeding with the following steps in response to a need to reduce the size, being the dimensions L, of the blocks;
   providing a fracturing fluid, comprising a mixture of the treatment material with e carrier fluid;
   establishing a concentration of treatment material (CTM-H) that can be injected into the fracks in the fracturing fluid, and forming the mixture to that concentration;
   carrying out measurements and calculations to determine the extent of the treatment area, being the area of the contaminated LPM;
   drilling boreholes at intervals over the treatment area;
   fracturing the ground around the holes, so as to form fracks, by injecting the fracturing fluid under pressure into the boreholes;
   spacing the boreholes a pitch distance apart over the treatment area such that the fracks overlap laterally;
   establishing a mathematical model, based on the PDR-C, for enabling a theoretical prediction to be made of the relationship between the distance L and the time period taken for CC-i to drop to a safe concentration (CC-safe);
   assigning an acceptable time period T for the CC-i to fall to CC-safe;
   from the model, computing the distance L corresponding to that time period T;
   forming a plurality of the fracks in the borehole, spaced a distance V apart, where V is no more than L;
   after fracturing, maintaining passive conditions in the fracks at the point of breakdown;
   wherein the passive conditions are such that, under the passive conditions, passive diffusion of the contaminant towards the boundaries of the LPM blocks takes place, substantially without the input of flow-inducing energy.

2. Procedure of claim 1, including the steps of:
   determining, by calculation based on diffusion rates, that the breakdown of the contaminant is of the kind wherein the effective concentration of the treatment material at the point of breakdown is depleted as a rate such that the treatment material needs to be replaced or refreshed after an interval or period of time P;
   proceeding with the following steps in response to the period P being shorter than the said period T;

refreshing the treatment material by a subsequent act or acts of injecting fresh treatment material into the fracks;

between refreshments, maintaining passive conditions in the fracks;

the passive conditions are such that, under the passive conditions, passive diffusion of the contaminant towards the boundaries of the LPM blocks takes place, substantially without the input of flow-inducing energy.

3. Procedure of claim 2, wherein the treatment material is in the solid phase, and is in the form of grains or particles.

4. Procedure of claim 2, wherein the treatment material is in the liquid phase, which includes non-aqueous phase liquids and liquids dissolved in water.

5. Procedure of claim 4, wherein the liquid treatment material diffuses into the LPM blocks, thereby effectively reducing the distance L by a distance R, and, in response to determining that reduction, correspondingly increasing the distance V apart of the fracks.

6. Procedure for treating contaminated groundwater, including the steps of:

establishing the nature of the contaminant in the ground, and selecting a suitable treatment material;

determining the nature of the ground, and proceeding with the following steps in response to the ground comprising large blocks of low permeability material (LPM), the contaminant being present within the large LPM blocks, and the large LPM blocks are intercalated with cracks or other zones of higher permeability;

providing conditions whereby passive diffusion of the contaminant from the interior towards the boundary of the block can take place;

proceeding with the following steps in response to an assessed need to reduce the size of the blocks;

providing a hydrofracturing liquid, comprising a mixture of the treatment material with a carrier liquid:

establishing a concentration of treatment material that can be injected into the hydrofracks in the hydrofracturing fluid, and forming the mixture to that concentration;

carrying out measurements and calculations to determine the extent of the treatment area, being the area of the ground containing the contaminated LPM;

drilling boreholes at intervals over the treatment area;

hydrofracturing the ground around the holes, so as to form hydrofracks, by injecting the hydrofracturing liquid under pressure from the surface into the boreholes;

spacing the boreholes a pitch distance apart over the treatment area such that the hydrofracks overlap laterally;

forming the hydrofracks in the boreholes a distance V apart;

after hydrofracturing, and thereafter, maintaining passive conditions in the hydrofracks at the point of breakdown, wherein the passive conditions are such that, under the passive conditions, passive diffusion of the contaminant towards the boundaries of the LPM blocks takes place, substantially without the input of flow-inducing energy;

and keeping the groundwater still and unmoving within the hydrofracks.

7. Procedure for injecting a treatment material into a treatment area of ground containing a contaminant, and comprising low permeability material, wherein:

the procedure includes the step of drilling boreholes at intervals over the treatment area;

the procedure includes the step of providing hydrofracturing liquid, comprising a mixture of the treatment material with a carrier liquid:

the procedure includes the step of hydrofracturing the ground around the holes, so as to form hydrofracks, by injecting the hydrofracturing liquid, which contains the treatment material, under pressure, into the boreholes;

after hydrofracturing, and thereafter, maintaining passive conditions in the hydrofracks, wherein the passive conditions are such that, under the passive conditions, passive diffusion of the contaminant towards the boundaries of the LPM blocks takes place, substantially without the input of flow-inducing energy;

and keeping the groundwater still and unmoving within the hydrofracks.

8. Procedure for injecting a treatment material into a treatment area of ground containing a contaminant, and comprising low permeability material, wherein:

the treatment material is in the liquid phase, which includes non-aqueous phase liquids and liquids dissolved in water;

the procedure includes the step of drilling boreholes at intervals over the treatment area;

the procedure includes the step of providing fracturing fluid, comprising a mixture of the treatment material with e carrier fluid:

the procedure includes the step of fracturing the ground around the holes, so as to form fracks, by injecting the fracturing fluid, which contains the treatment material, under pressure, into the boreholes;

after fracturing, and thereafter, maintaining passive conditions in the fracks, wherein the passive conditions are such that, under the passive conditions, passive diffusion of the contaminant towards the boundaries of the LPM blocks takes place, substantially without the Input of flow-inducing energy;

and keeping the groundwater still and unmoving within the cracks.

9. Procedure of claim 8, wherein the fracturing fluid contains, mixed evenly therein, grains of a solid-phase material, so constituted as to hold the fracks propped open.

10. Procedure of claim 9, including the step, after a period of passive diffusion, of injecting a fresh charge of liquid treatment material into the propped-open fracks.

11. Procedure for treating slowly-moving contaminated groundwater, comprising the steps of:

establishing the nature of the contaminant in the ground, and selecting a suitable treatment material, the selected treatment material being of the kind that will bring about a chemical breakdown of the contaminant when the contaminant is located, at a point of breakdown, in close physical proximity to the treatment material, being breakdown of the kind wherein: (a) the contaminant is chemically converted into a relatively non-contaminating substance, (b) the concentration of the contaminant at the point of breakdown is substantially depleted by the breakdown, and (c) the effective concentration of the treatment material at the point of breakdown is unaffected or affected only relatively slowly by the breakdown;

determining the direction end speed of movement of a plume of the contaminant in the groundwater;

establishing a treatment zone in the ground, in the path of the plume;

determining the nature of the ground in the treatment zone, and proceeding with the following steps in response to the ground comprising large blocks of low permeability material (LPM):

carrying out measurements and calculations to determine the extent of the treatment zone;

drilling boreholes at intervals over the treatment zone;

proceeding with the following steps in response to an assessed need to reduce the size of the blocks;

providing a ground-fracturing fluid;

fracturing the ground around the holes, so as to form fracks, by injecting the ground-fracturing fluid under pressure from the surface into the boreholes;

spacing the boreholes a pitch distance apart over the treatment zone, such that the fracks overlap laterally;

in each borehole, forming the fracks in the borehole a vertical distance V apart, the fracks comprising cracks, within the LPM, of relatively high permeability, whereby the large blocks of LPM are broken up;

Injecting the treatment material, at a suitable concentration, into the fracks, whereby the treatment material is transferred into, and remains in, the fracks;

after fracturing, and thereafter, maintaining passive conditions in the fracks at the point of breakdown, wherein the passive conditions are such that, under the passive conditions, passive diffusion of the contaminant towards the boundaries of the LPM blocks takes place, substantially without the input of flow-inducing energy;

whereby the said contaminants in the slowly-moving groundwater moving naturally through the treatment zone are broken down.

12. Procedure for treating contaminated groundwater, comprising the steps of:

establishing the nature of the contaminant in the ground, and selecting a suitable treatment material, the selected treatment material being of the kind that will bring about a chemical breakdown of the contaminant when the contaminant is located, at a point of breakdown, in close physical proximity to the treatment material, being breakdown of the kind wherein: (a) the contaminant is chemically converted into a relatively non-contaminating substance, (b) the concentration of the contaminant at the point of breakdown is substantially depleted by the breakdown, and (c) the effective concentration of the treatment material at the point of breakdown is unaffected or affected only relatively slowly by the breakdown;

establishing a treatment zone;

determining the nature of the ground in the treatment zone, and proceeding with the following steps In response to the ground comprising large blocks of low permeability material (LPM);

carrying out measurements and calculations to determine the extent of the treatment zone; drilling boreholes at intervals over the treatment zone;

proceeding with the following steps In response to an assessed need to reduce the size of the blocks;

providing a ground-fracturing fluid;

fracturing the ground around the boreholes, so as to form fracks, by Injecting the ground-fracturing fluid under pressure from the surface into the boreholes;

spacing the boreholes a pitch distance apart over the treatment zone, such that the fracks overlap laterally;

in each borehole, forming the fracks in the borehole a vertical distance V apart, the fracks comprising cracks, within the LPM, of relatively high permeability, whereby the large blocks of LPM are broken up;

injecting the treatment material, at a suitable concentration, into the fracks, whereby the treatment material is transferred into, and remains in, the fracks;

after fracturing, end thereafter, maintaining passive conditions in the fracks at the point of breakdown, wherein the passive conditions are such that, under the passive conditions, passive diffusion of the contaminant towards the boundaries of the LPM blocks takes place, substantially without the input of flow-inducing energy;

whereby the said contaminants in the groundwater in the treatment zone are broken down.

13. Procedure of claim 12, wherein the treatment material remains present in the crack when the injection pressure is released.

14. Procedure for claim 12, wherein the body of treatment material is mixed with particles remaining in the crack that do not cause treatment but provide desired permeability in the crack.

15. Procedure for claim 12, wherein solid treatment material in the crack emits dissolved treatment materials that migrates or diffuses into the LPM to cause treatment away from the crack.

16. Procedure of claim 12, wherein:

Inserting solid particles into the crack hold the crack open to provide permeability for liquid;

injecting treatment liquids into the open crack to cause treatment in the crack and migration or diffusion of constituents from the liquid into the LPM to cause treatment away from the crack.

17. Procedure for claim 12, wherein the dissolved contaminants are caused to migrate from the LPM into the crack where they are degraded, destroyed or immobilized by the treatment material in the crack.

18. Procedure of claim 12, wherein the crack extends radially all around the borehole, whereby the treatment material injected with the injection-fluid forms a body which is substantially disc-like in shape.

19. Procedure of claim 12, wherein the procedure includes the steps of:

providing, in each borehole, a respective injection port, comprising inflatable packers or other means of sealing the hole and an injection pipe;

lowering the port down the borehole hole, inflating the packers when the port is at the desired depth or otherwise sealing the hole, forming a notch in the walls of the borehole near the injection port, and injecting the fluid and reaction materials therefrom so as to create a disc of injection-fluid in the LPM;

after injection, releasing the injection pressure, and releasing the inflatable packers;

moving the port up/down the hole to a new depth, re-inflating the packers, and creating a new disc at that depth.

20. Procedure of claim 19, wherein several discs are created per borehole, stacked vertically.

21. Procedure of claim 19, wherein many boreholes are positioned over the extent of the contaminated area, each having at least one disc.

22. Procedure of claim 12, wherein many boreholes are provided, pitched around a contaminated area so as to provide a treatment curtain, such that contaminated groundwater cannot migrate from the area without passing through the treatment curtain.

23. Procedure of claim 12, wherein the reactive material injected into the borehole forms vertical spirals;

and such spirals are positioned close together to form a wall of permeable material to treat contaminated groundwater that moves through the wall.

24. Procedure for claim 12, wherein the discs are positioned so as to form a horizontal or nearly horizontal zone in the LPM beneath a contaminated zone to treat contaminants that move downward from the zone.

* * * * *

UNITED STATES PATENT AND TRADEMARK OFFICE
CERTIFICATE OF CORRECTION

PATENT NO. : 5,641,020
DATED : 24 Jun 1997
INVENTOR(S) : Cherry et al.

It is certified that error appears in the above-identified patent and that said Letters Patent is hereby corrected as shown below:

On the title page: Item [75]
The inventors for this patent should be listed as:
Beth L Parker; John Anthony Cherry, both of Waterloo, Canada Item [19]
The patent should be recognized as: Parker et al.

Signed and Sealed this

Ninth Day of December, 1997

Attest:

BRUCE LEHMAN

Attesting Officer

Commissioner of Patents and Trademarks